United States Patent
Patel et al.

(10) Patent No.: US 10,499,356 B2
(45) Date of Patent: Dec. 3, 2019

(54) GUARD PERIOD MODIFICATION IN A TIME DIVISION DUPLEXING WIRELESS SYSTEM

(71) Applicant: QUALCOMM Incorporated, San Diego, CA (US)

(72) Inventors: Shimman Arvind Patel, San Diego, CA (US); Wanshi Chen, San Diego, CA (US); Peter Gaal, San Diego, CA (US); Juan Montojo, San Diego, CA (US); Jing Sun, San Diego, CA (US); Seyedkianoush Hosseini, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 120 days.

(21) Appl. No.: 15/423,285

(22) Filed: Feb. 2, 2017

(65) Prior Publication Data
US 2017/0367062 A1    Dec. 21, 2017

Related U.S. Application Data

(60) Provisional application No. 62/351,805, filed on Jun. 17, 2016.

(51) Int. Cl.
*H04J 3/06*    (2006.01)
*H04W 56/00*    (2009.01)
(Continued)

(52) U.S. Cl.
CPC ...... *H04W 56/0045* (2013.01); *H04B 17/364* (2015.01); *H04L 5/14* (2013.01);
(Continued)

(58) Field of Classification Search
CPC ............ H04W 56/0045; H04W 56/003; H04L 27/16; H04L 27/2646; H04L 27/2666; H04L 12/28; H04L 12/56
See application file for complete search history.

(56) References Cited

U.S. PATENT DOCUMENTS 8,982,892 B2 *  3/2015  Gan ...................... H04W 24/02
                                                      370/395.4
9,332,466 B2 *  5/2016  Yang .................... H04W 36/08
(Continued)

FOREIGN PATENT DOCUMENTS

WO    WO-2013191419 A1    12/2013

OTHER PUBLICATIONS

ISA/EP, International Search Report and Written Opinion of the International Searching Authority, Int'l Application No. PCT/US2017/034789, dated Aug. 30, 2017, European Patent Office, Rijswijk, NL, 13 pgs.

*Primary Examiner* — Hanh N Nguyen
(74) *Attorney, Agent, or Firm* — Holland & Hart LLP

(57) ABSTRACT

Modifiable guard periods are provided for time division duplexing (TDD) wireless communications. Guard periods may be modified based at least in part on propagation delay information, such as timing advance (TA) information, for one or more user equipment (UE) in a TDD wireless system. Modifiable guard periods may allow for enhanced system efficiency for the TDD wireless system relative to systems that may use a static or semi-statically configured guard period for TDD communications. Modifiable guard periods may in some cases allow one or more uplink or downlink transmissions to be provided within a legacy guard period of a legacy TDD special subframe.

28 Claims, 27 Drawing Sheets

(51) Int. Cl.

| | | |
|---|---|---|
| *H04B 17/364* | (2015.01) | |
| *H04L 5/14* | (2006.01) | |
| *H04L 27/26* | (2006.01) | |
| *H04W 52/36* | (2009.01) | |
| *H04W 72/04* | (2009.01) | |
| *H04W 72/12* | (2009.01) | |

(52) U.S. Cl.
 CPC ...... *H04L 27/2601* (2013.01); *H04L 27/2607* (2013.01); *H04W 52/362* (2013.01); *H04W 56/003* (2013.01); *H04W 72/0413* (2013.01); *H04W 72/0446* (2013.01); *H04W 72/1268* (2013.01); *H04W 72/1273* (2013.01)

(56) References Cited

U.S. PATENT DOCUMENTS

| | | | |
|---|---|---|---|
| 9,398,551 B2* | 7/2016 | Fwu | H04W 52/18 |
| 9,532,369 B2* | 12/2016 | Susitaival | H04L 5/1469 |
| 2015/0117270 A1 | 4/2015 | Um et al. | |

* cited by examiner

GUARD PERIOD MODIFICATION IN A TIME DIVISION DUPLEXING WIRELESS SYSTEM

CROSS REFERENCES

The present Application for Patent claims priority to U.S. Provisional Patent Application No. 62/351,805, entitled "Guard Period Modification In A Time Division Duplexing Wireless System," filed Jun. 17, 2016, assigned to the assignee hereof.

BACKGROUND

The following relates generally to wireless communication, and more specifically to guard period modification in a time division duplexing (TDD) wireless system.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system). A wireless multiple-access communications system may include a number of base stations, each simultaneously supporting communication for multiple communication devices, which may be otherwise known as user equipment (UE).

Various wireless communications systems may operate using frequency division duplexing (FDD), in which paired spectrum resources may be used for concurrent uplink and downlink transmissions, or time division duplexing (TDD), in which unpaired spectrum resources may be time division multiplexed for uplink and downlink transmissions. Frame structures for FDD and TDD may be defined for a particular wireless communications system. For example, in some TDD frame structures, certain transmissions may carry uplink or downlink traffic, and a guard period may be used during a transition to switch between downlink and uplink transmissions. A guard period may be a period during which devices do not transmit, but may receive transmissions. Such a guard period may help to reduce interference where a transmitting device may begin transmission prior to a receiving device having received a different transmission (e.g., due to propagation delay of the signal transmitted to the receiving device). A guard period also may allow transmit/receive chain hardware components of a device to physically switch between transmission and receive modes.

SUMMARY

The described techniques relate to improved methods, systems, devices, or apparatuses that support guard period modification in a time division duplexing (TDD) wireless system. Generally, the described techniques provide for adaptable guard periods based at least in part on propagation delay information, such as timing advance (TA) information, for one or more transmitters in the TDD wireless system. Adaptable guard periods may allow for enhanced system efficiency for the TDD wireless system relative to systems that may use a static or semi-statically configured guard period for TDD communications. For example, system efficiency may be enhanced by allowing the guard period to be shortened to reduce overhead, and system capacity may be increased due to the guard period overhead reduction. Additionally, the guard period duration, in some examples, may be dynamically modified while avoiding interference with other transmitters in the TDD wireless system (e.g., avoiding intra-cell and inter-cell interference in a TDD wireless system).

In some examples, a first device operating on a TDD wireless system (e.g., a base station in a TDD wireless communications network) may determine propagation delay information for other devices of the TDD wireless system (e.g., one or more user equipment (UE) in the TDD wireless communications network). The propagation delay information may allow the first device to determine when other devices may begin and end transmissions in order for transmissions to be received at an associated receiving device prior to another device initiating a transmission that may interfere with reception at the receiving device. For example, one or more devices (e.g., UEs in a TDD wireless communications system) may determine TA information that identifies a round-trip delay for wireless communications with another device (e.g., a base station in the TDD wireless communications system). The TA information may be used to determine a minimum guard period for TDD communications between the devices. In some examples, one or more devices may operate in a manner that is compatible with a legacy TDD wireless system by allowing one or more devices to transmit within a legacy guard period while avoiding interference with other transmissions of the system.

A method of wireless communication is described. The method may include identifying a guard region associated with a transition between a downlink transmission and an uplink transmission in a TDD system, identifying TAs for the downlink transmission and the uplink transmission adjacent to the guard region, and dynamically adjusting a guard period within the guard region based at least in part on the identified TAs.

An apparatus for wireless communication is described. The apparatus may include means for identifying a guard region associated with a transition between a downlink transmission and an uplink transmission in a TDD system, means for identifying TAs for the downlink transmission and the uplink transmission adjacent to the guard region, and means for dynamically adjusting a guard period within the guard region based at least in part on the identified TAs.

Another apparatus for wireless communication is described. The apparatus may include a processor, memory in electronic communication with the processor, and instructions stored in the memory. The instructions may be operable to cause the processor to identify a guard region associated with a transition between a downlink transmission and an uplink transmission in a TDD system, identify TAs for the downlink transmission and the uplink transmission adjacent to the guard region, and dynamically adjust a guard period within the guard region based at least in part on the identified TAs.

A non-transitory computer readable medium for wireless communication is described. The non-transitory computer-readable medium may include instructions operable to cause a processor to identify a guard region associated with a transition between a downlink transmission and an uplink transmission in a TDD system, identify TAs for the downlink transmission and the uplink transmission adjacent to the guard region, and dynamically adjust a guard period within the guard region based at least in part on the identified TAs.

Some examples of the method, apparatus, and non-transitory computer-readable medium described above may further include processes, features, means, or instructions for scheduling uplink resource allocations and downlink resource allocations for one or more UEs to receive the downlink transmission or transmit the uplink transmission outside of the guard period and within the guard region. In some examples of the method, apparatus, and non-transitory computer-readable medium described above, the guard region corresponds to a legacy guard period of the TDD system. Some examples of the method, apparatus, and non-transitory computer-readable medium described above may further include processes, features, means, or instructions for scheduling uplink resource allocations and downlink resource allocations for one or more UEs to receive the downlink transmission or transmit the uplink transmission outside of the guard region.

Some examples of the method, apparatus, and non-transitory computer-readable medium described above may further include processes, features, means, or instructions for scheduling uplink resource allocations and downlink resource allocations for one or more UEs to receive the downlink transmission or transmit the uplink transmission based at least in part on the identified TAs.

In some examples of the method, apparatus, and non-transitory computer-readable medium described above, the scheduling comprises: identifying two or more downlink UEs, determining that a first downlink UE may have a shorter TA than a second downlink UE, and allocating a first subset of downlink resources to the first downlink UE and a second subset of downlink resources to the second downlink UE, the first subset of downlink resources being closer in time to the guard period than the second subset of downlink resources.

In some examples of the method, apparatus, and non-transitory computer-readable medium described above, the scheduling further comprises: identifying two or more uplink UEs, determining that a first uplink UE may have a shorter TA than a second uplink UE, and allocating a first subset of uplink resources to the first uplink UE and a second subset of uplink resources to the second uplink UE, the first subset of uplink resources being closer in time to the guard period than the second subset of uplink resources.

In some examples of the method, apparatus, and non-transitory computer-readable medium described above, the identifying TAs comprises polling a plurality of user equipment devices for associated TAs. In some examples of the method, apparatus, and non-transitory computer-readable medium described above, the identifying TAs comprises: receiving periodic transmissions from a plurality of UEs, the periodic transmissions including TA information for the UEs. Some examples of the method, apparatus, and non-transitory computer-readable medium described above may further include processes, features, means, or instructions for configuring the plurality of UEs to periodically transmit the TA information via radio resource control (RRC) signaling. In some examples of the method, apparatus, and non-transitory computer-readable medium described above, the TA information may be transmitted in an information element in a physical uplink control channel (PUCCH) transmission. In some examples of the method, apparatus, and non-transitory computer-readable medium described above, the guard region may be within a TDD special subframe.

In some examples of the method, apparatus, and non-transitory computer-readable medium described above, identifying a guard line within the guard region that identifies: a latest time by which a UE may complete reception of the downlink transmission, and an earliest time that a UE may start transmitting the uplink transmission. In some examples of the method, apparatus, and non-transitory computer-readable medium described above, dynamically adjusting the guard period comprises: determining an end time for the downlink transmission based on the guard line and the TA for the downlink transmission, and allocating downlink resources based at least in part on the end time for the downlink transmission.

Some examples of the method, apparatus, and non-transitory computer-readable medium described above may further include processes, features, means, or instructions for dynamically adjusting the guard period by determining a start time for the uplink transmission based on the guard line and the TA for the uplink transmission, and allocating uplink resources based at least in part on the start time for the uplink transmission. In some examples of the method, apparatus, and non-transitory computer-readable medium described above, the guard line may be identified for a plurality of neighboring base stations of the TDD system.

Some examples of the method, apparatus, and non-transitory computer-readable medium described above may further include processes, features, means, or instructions for dynamically adjusting a power density for transmissions adjacent to the guard region based at least in part on the identified TAs. In some examples of the method, apparatus, and non-transitory computer-readable medium described above, the power density may be adjusted for a duration of a transmission time interval (TTI) of the downlink transmission or the uplink transmission. In some examples of the method, apparatus, and non-transitory computer-readable medium described above, the power density may be adjusted for a duration of an orthogonal frequency division multiplexing (OFDM) symbol of the downlink transmission or the uplink transmission based at least in part on a location of the OFDM symbol relative to the guard period. In some examples of the method, apparatus, and non-transitory computer-readable medium described above, the power density for transmissions adjacent to the guard region may be mapped based on a location of wireless resources used for the transmissions relative to the guard period. In some examples of the method, apparatus, and non-transitory computer-readable medium described above, the power density for transmissions adjacent to the guard region may be signaled prior to the transmissions. In some examples of the method, apparatus, and non-transitory computer-readable medium described above, the signaling indicates one or more of power steps in time or changes to a traffic-to-pilot ratio (TPR) in time.

A method of wireless communication is described. The method may include receiving TA information from a plurality of UEs in a TDD system, identifying a guard region associated with a transition between a downlink transmission and an uplink transmission in the TDD system, and scheduling uplink resource allocations and downlink resource allocations for a subset of UEs adjacent to the guard region based at least in part on the received TA information.

An apparatus for wireless communication is described. The apparatus may include means for receiving TA information from a plurality of UEs in a TDD system, means for identifying a guard region associated with a transition between a downlink transmission and an uplink transmission in the TDD system, and means for scheduling uplink resource allocations and downlink resource allocations for a subset of UEs adjacent to the guard region based at least in part on the received TA information.

Another apparatus for wireless communication is described. The apparatus may include a processor, memory in electronic communication with the processor, and instructions stored in the memory. The instructions may be operable to cause the processor to receive TA information from a plurality of UEs in a TDD system, identify a guard region associated with a transition between a downlink transmission and an uplink transmission in the TDD system, and schedule uplink resource allocations and downlink resource allocations for a subset of UEs adjacent to the guard region based at least in part on the received TA information.

A non-transitory computer readable medium for wireless communication is described. The non-transitory computer-readable medium may include instructions operable to cause a processor to receive TA information from a plurality of UEs in a TDD system, identify a guard region associated with a transition between a downlink transmission and an uplink transmission in the TDD system, and schedule uplink resource allocations and downlink resource allocations for a subset of UEs adjacent to the guard region based at least in part on the received TA information.

Some examples of the method, apparatus, and non-transitory computer-readable medium described above may further include processes, features, means, or instructions for determining a subset of the plurality UEs with TA times at or below a threshold, and scheduling uplink resource allocations and downlink resource allocations for the subset of UEs to be closer to a guard period within the guard region than uplink resource allocations and downlink resource allocations for UEs with TA times above the threshold.

In some examples of the method, apparatus, and non-transitory computer-readable medium described above, a guard period within the guard region may be dynamically adjusted based at least in part on the TA information from the plurality of UEs.

Some examples of the method, apparatus, and non-transitory computer-readable medium described above may further include processes, features, means, or instructions for polling the plurality of UEs for the TA information. Some examples of the method, apparatus, and non-transitory computer-readable medium described above may further include processes, features, means, or instructions for receiving periodic transmissions including the TA information from the plurality of UEs. Some examples of the method, apparatus, and non-transitory computer-readable medium described above may further include processes, features, means, or instructions for configuring the plurality of UEs to periodically transmit the TA information via RRC signaling.

In some examples of the method, apparatus, and non-transitory computer-readable medium described above, the guard region may be within a TDD special subframe, and wherein scheduling the downlink resource allocations comprises: allocating resources for at least one UE of the subset of UEs following a downlink pilot time slot (DwPTS) of the TDD special subframe. In some examples of the method, apparatus, and non-transitory computer-readable medium described above, scheduling the downlink resource allocations further comprises: allocating resources for at least one UE of the subset of UEs prior to an uplink pilot time slot (UpPTS) of the TDD special subframe. Some examples of the method, apparatus, and non-transitory computer-readable medium described above may further include processes, features, means, or instructions for allocating two or more UEs resources within a legacy guard period of the TDD special subframe.

In some examples of the method, apparatus, and non-transitory computer-readable medium described above, scheduling the uplink resource allocations and downlink resource allocations for the subset of UEs further comprises: frequency division multiplexing two or more UEs of the subset of UEs having similar TA values.

A method of wireless communication is described. The method may include identifying a guard region associated with a transition between a downlink transmission and an uplink transmission in a TDD system, determining a TA for communications with a base station in the TDD system, transmitting the TA to the base station, and receiving, from the base station, a resource allocation having a location relative to the guard region that is determined based at least in part on the TA.

An apparatus for wireless communication is described. The apparatus may include means for identifying a guard region associated with a transition between a downlink transmission and an uplink transmission in a TDD system, means for determining a TA for communications with a base station in the TDD system, means for transmitting the TA to the base station, and means for receiving, from the base station, a resource allocation having a location relative to the guard region that is determined based at least in part on the TA.

Another apparatus for wireless communication is described. The apparatus may include a processor, memory in electronic communication with the processor, and instructions stored in the memory. The instructions may be operable to cause the processor to identify a guard region associated with a transition between a downlink transmission and an uplink transmission in a TDD system, determine a TA for communications with a base station in the TDD system, transmit the TA to the base station, and receive, from the base station, a resource allocation having a location relative to the guard region that is determined based at least in part on the TA.

A non-transitory computer readable medium for wireless communication is described. The non-transitory computer-readable medium may include instructions operable to cause a processor to identify a guard region associated with a transition between a downlink transmission and an uplink transmission in a TDD system, determine a TA for communications with a base station in the TDD system, transmit the TA to the base station, and receive, from the base station, a resource allocation having a location relative to the guard region that is determined based at least in part on the TA.

Some examples of the method, apparatus, and non-transitory computer-readable medium described above may further include processes, features, means, or instructions for receiving a TA polling request from the base station, and determining the TA and transmitting the TA responsive to the polling request. Some examples of the method, apparatus, and non-transitory computer-readable medium described above may further include processes, features, means, or instructions for determining the TA and transmitting the TA may be performed periodically. In some examples of the method, apparatus, and non-transitory computer-readable medium described above, a periodicity of determining the TA and transmitting the TA may be configured by the base station via RRC signaling. In some examples of the method, apparatus, and non-transitory computer-readable medium described above, the TA may be transmitted in an information element in a control channel transmission to the base station.

In some examples of the method, apparatus, and non-transitory computer-readable medium described above, the guard region may be within a TDD special subframe of the TDD system, and wherein the resource allocation may be a downlink resource allocation scheduled following a downlink pilot time slot (DwPTS) of the TDD special subframe.

In some examples of the method, apparatus, and non-transitory computer-readable medium described above, the guard region may be within a TDD special subframe of the TDD system, and the resource allocation may be an uplink resource allocation scheduled prior to an uplink pilot time slot (UpPTS) of the TDD special subframe.

In some examples of the method, apparatus, and non-transitory computer-readable medium described above, the resource allocation comprises a frequency division multiplexed resource allocation with one or more other transmitters.

In some examples of the method, apparatus, and non-transitory computer-readable medium described above, the resource allocation further comprises a power density adjustment based at least in part on the TA.

In some examples of the method, apparatus, and non-transitory computer-readable medium described above, the power density may be adjusted for a duration of a TTI of the resource allocation.

In some examples of the method, apparatus, and non-transitory computer-readable medium described above, the power density may be adjusted for a duration of an OFDM symbol of the resource allocation based at least in part on a location of the OFDM symbol relative to the guard region.

In some examples of the method, apparatus, and non-transitory computer-readable medium described above, the power density may be adjusted based at least in part on a mapping of a location of resources within the resource allocation relative to the guard region.

In some examples of the method, apparatus, and non-transitory computer-readable medium described above, the power density may be received in signaling associated with the resource allocation.

In some examples of the method, apparatus, and non-transitory computer-readable medium described above, the signaling indicates one or more of power steps in time or changes to a traffic-to-pilot ratio (TPR) in time.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
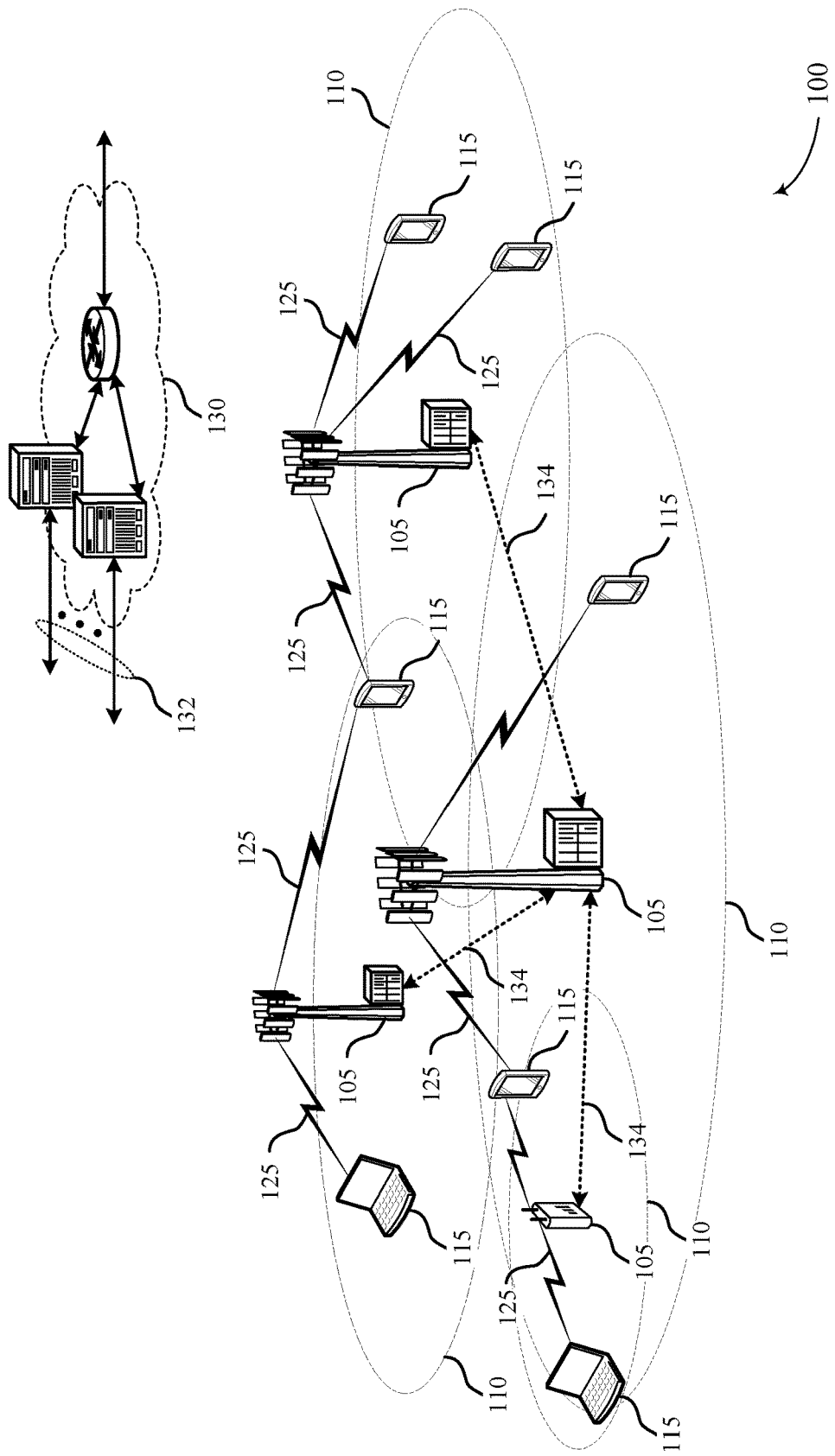
FIG. 1 illustrates an example of a wireless communication system that supports guard period modification in a time division duplexing (TDD) wireless system in accordance with aspects of the present disclosure.

The present disclosure provides techniques for guard period modification in a time division duplexing (TDD)

wireless system. In some examples, a TDD wireless system may enhance guard periods by selectively scheduling users in a way that limits intra-cell and inter-cell interference. The effective result is a shortening of the guard period overhead and thereby an increase in the capacity of the TDD wireless system. In some examples, guard periods between downlink and uplink transmissions may be based at least in part on propagation delay information, such as TA information, for one or more transmitters in the TDD wireless system. In some legacy systems (e.g., long term evolution (LTE) wireless systems that use TDD) a special subframe (e.g., a subframe having frame structure type 2 as defined in the LTE standards) may be used for transitions between downlink and uplink transmissions. Such special subframes may be selected to provide different duration of guard periods on a semi-static basis, to allow switching between downlink and uplink transmissions and prevent interference to the downlink users by the uplink users. In such legacy systems, the duration of the guard period needs to account for the worst case cell size and is selected to be larger than the round-trip delay for a cell-edge user.

As indicated above, aspects of the present disclosure provide adaptable guard periods that may allow for enhanced system efficiency for TDD wireless systems relative to legacy TDD systems that may use a static or semi-statically configured guard period for TDD communications. For example, system efficiency may be enhanced by allowing the guard period to be shortened to reduce overhead, and thereby increasing system capacity due to the guard period overhead reduction. Additionally, the guard period duration, in some examples, may be dynamically modified while avoiding interference with other transmitters in the TDD wireless system (e.g., avoiding intra-cell and inter-cell interference in a TDD wireless system).

In some examples, a first device operating on a TDD wireless system (e.g., a base station in a TDD wireless communications network) may determine propagation delay information for other devices of the TDD wireless system (e.g., a user equipment (UE) in the TDD wireless communications network). The propagation delay information may allow the first device to determine when other devices may begin and end transmissions in order for transmissions to be received at an associated receiving device prior to another device initiating a transmission that may interfere with reception at the receiving device. For example, one or more devices (e.g., UEs in a TDD wireless communications network) may determine TA information that identifies a round-trip delay for wireless communications with another device (e.g., a base station in the TDD wireless communications network). The TA information may be used to determine a minimum guard period for TDD communications between the devices. In some examples, one or more devices may operate in a manner that is compatible with a legacy TDD wireless system by allowing one or more devices to transmit within a legacy guard period while avoiding interference with other transmissions of the system.

Aspects of the disclosure are initially described in the context of a wireless communications system. Guard periods and techniques for modification of guard periods are then described. Aspects of the disclosure are further illustrated by and described with reference to apparatus diagrams, system diagrams, and flowcharts that relate to guard period modification in a TDD wireless system.

FIG. 1 illustrates an example of a wireless communications system 100 that supports guard period modification in a time division duplexing (TDD) wireless system in accordance with aspects of the present disclosure. The wireless communications system 100 includes base stations 105, UEs 115, and a core network 130. In some examples, the wireless communications system 100 may be a LTE (or LTE-Advanced) network. In some examples, the wireless communications system 100 may be a TDD wireless system in which guard periods between downlink and uplink transmissions may be based at least in part on TA information for the UEs 115.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. UEs 115 may be dispersed throughout the wireless communications system 100, and each UE 115 may be stationary or mobile. A UE 115 may also be referred to as a mobile station, a subscriber station, a remote unit, a wireless device, an access terminal (AT), a handset, a user agent, a client, or like terminology. A UE 115 may also be a cellular phone, a wireless modem, a handheld device, a personal computer, a tablet, a personal electronic device, a machine type communication (MTC) device, etc.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

In some cases, wireless communications system 100 may utilize enhanced component carriers (eCCs). An eCC may be characterized by one or more features including: wider bandwidth, shorter symbol duration, shorter transmission time interval (TTIs), and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power). In some cases, an eCC may utilize a different symbol duration than other CCs, which may include use of a reduced symbol duration as compared with symbol durations of the other CCs. A shorter symbol duration may be associated with increased subcarrier spacing. A device, such as a UE 115 or base station 105, utilizing eCCs may transmit wideband signals (e.g., 20, 40, 60, 80 MHz, etc.) at reduced symbol durations (e.g., 16.67 microseconds). A TTI in eCC may consist of one or multiple symbols. In some cases, the TTI duration (that is, the number of symbols in a TTI) may be variable.

A physical uplink control channel (PUCCH) may be used for uplink acknowledgements (ACKs), scheduling requests (SRs) and channel quality indicator (CQI), and other uplink control information. A PUCCH may be mapped to a control channel defined by a code and two consecutive resource blocks. Uplink control signaling may depend on the presence of timing synchronization for a cell. PUCCH resources for SR and CQI reporting may be assigned (and revoked) through RRC signaling. In some cases, UEs 115 may also transmit timing advance (TA) information to base stations 105 using PUCCH resources. In such cases, the PUCCH resources may include an information element that is configured to include TA information that may be assigned (and revoked) through radio resource control (RRC) signaling.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include CDMA systems, TDMA systems, FDMA systems, and OFDMA systems. A wireless multiple-access communications system may include a number of base stations, each simultaneously supporting communication for one or more multiple communication devices, which may be otherwise known as a UE.

As indicated above, in some cases carriers may transmit bidirectional communications using FDD (e.g., using paired spectrum resources) or TDD operation (e.g., using unpaired spectrum resources). Frame structures for FDD (e.g., frame structure type 1) and TDD (e.g., frame structure type 2) may be defined. For TDD frame structures, each subframe may carry uplink (UL) or downlink (DL) traffic, and special subframes may be used to switch between downlink and uplink transmission. Allocation of uplink and downlink subframes within radio frames may be symmetric or asymmetric and may be statically determined or may be reconfigured semi-statically. Special subframes may carry downlink or uplink traffic and may include a guard period between downlink and uplink traffic. Switching from uplink to downlink traffic, in some deployments, may be achieved by setting a TA at the UE 115 without the use of special subframes or a guard period. Use of TDD offers flexible deployments without requiring paired UL-DL spectrum resources. In some TDD network deployments, interference may be caused between uplink and downlink communications (e.g., interference between uplink and downlink communication from different base stations, interference between uplink and downlink communications from base stations and UEs, etc.). For example, where different base stations 105 serve different UEs 115 within overlapping coverage areas according to different TDD UL-DL configurations, a UE 115 attempting to receive and decode a downlink transmission from a serving base station 105 can experience interference from uplink transmissions from other, proximately located UEs 115. As indicated above, guard periods may be provided to reduce or prevent such interference.

Figure 2:
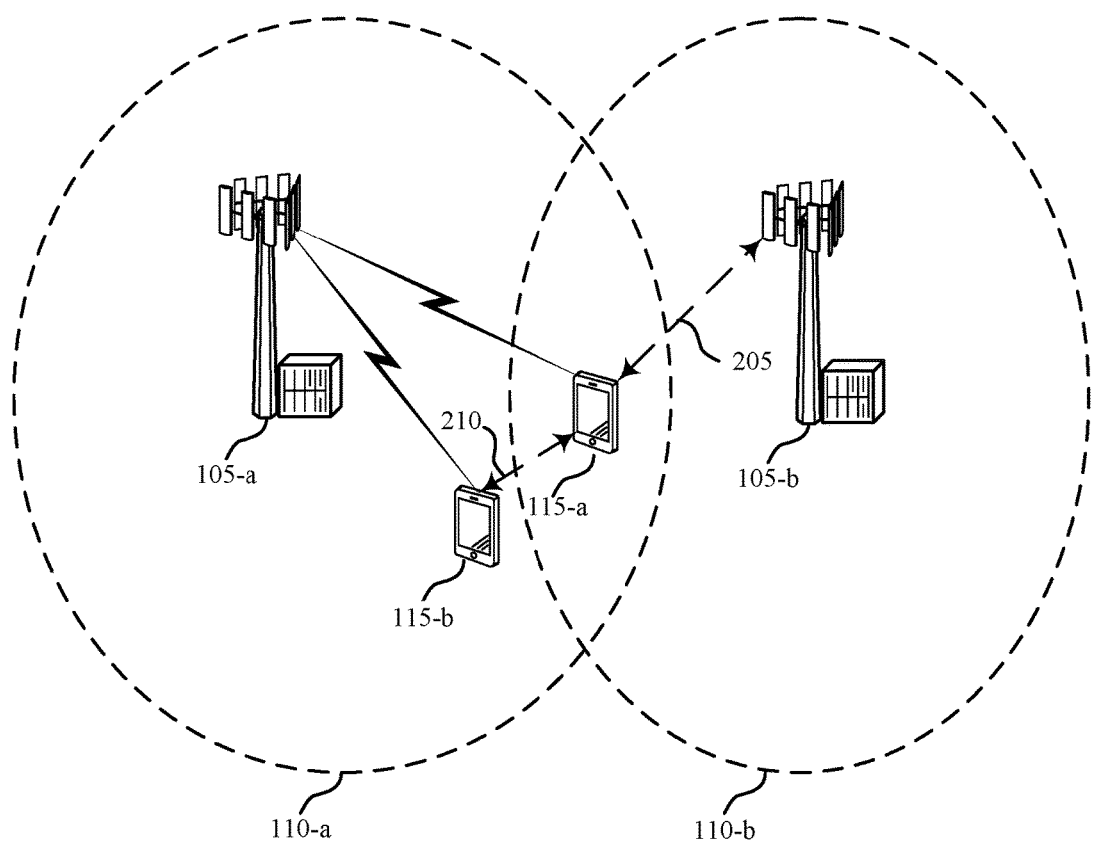
FIG. 2 illustrates an example of a wireless communications system that supports guard period modification in a TDD wireless system in accordance with aspects of the present disclosure.

FIG. 2 illustrates an example of a wireless communications system 200 that supports guard period modification in a TDD wireless system in accordance with aspects of the present disclosure. Wireless communications system 200 may include a first base station 105-a with a corresponding first coverage area 110-a, a second base station 105-b a corresponding second coverage area 110-b, a first UE 115-a, and a second UE 115-b, which may be examples of the corresponding devices described with reference to FIG. 1.

In the example of FIG. 2, the first UE 115-a and second UE 115-b may communicate with first base station 105-a using TDD wireless communications. In this example, the first UE 115-a is within the first coverage area 110-a of the first base station 105-a, and also within the second coverage area 110-b of the second base station 105-b. Thus, the first UE 115-a may be subject to multiple types of interference. For example, first UE 115-a may be subject to inter-cell interference 205, which may occur if the second base station 105-b initiates transmissions before the first UE 115-a has completed reception of a downlink transmission from the first base station 105-a. Additionally, the first UE 115-a may be subject to intra-cell interference 210, which may occur if the second UE 115-b initiates transmissions before the first UE 115-a has completed reception of a downlink transmission from the first base station 105-a.

In some examples, the first base station 105-a may configure a guard period between downlink and uplink transmissions such that the first UE 115-a will not be, or is less likely to be, subject to either inter-cell interference 205 or intra-cell interference 210. Intra-cell interference 210 may be reduced by scheduling the first UE 115-a and second UE 115-b to have non-overlapping transmissions with sufficient time in the guard period to account for a propagation delay in receiving a downlink transmission from the first base station 105-a at the first UE 115-a prior to scheduling an uplink transmission from the second UE 115-b. Inter-cell interference 205 may be reduced, in some examples, by establishing a guard line to be used by both the first base station 105-a and the second base station 105-b, that identifies a latest time by which any UE 115 of the wireless communications system 200 that is to receive a downlink transmission is to complete reception of the downlink transmission, and an earliest time that any UE 115 of the wireless communications system 200 may start transmitting an uplink transmission.

The first base station 105-a and second base station 105-b may thus use the guard line along with TA information from UEs 115 that are to receive and send transmissions, to determine the guard period. In some examples, UEs 115 may transmit their TA information to the first base station 105-a, such as in a periodic transmission (e.g., a low duty-cycle periodic transmission) or in response to polling (e.g., periodic or asynchronous polling) by the first base station 105-a. The received TA information may be used by the first base station 105-a, to determine the guard period. In some examples, the first base station 105-a may also identify a guard region associated with the transition between a downlink transmission and an uplink transmission. The guard region may, in some cases, correspond to a legacy guard period, and the first base station 105-a may schedule downlink resource allocations for the first UE 115-a to receive a downlink transmission outside of the guard period and within the guard region. Similarly, the base station 105-a may schedule uplink resource allocations for the second UE 115-b to transmit an uplink transmission outside of the guard period and within the guard region.

Figure 3:
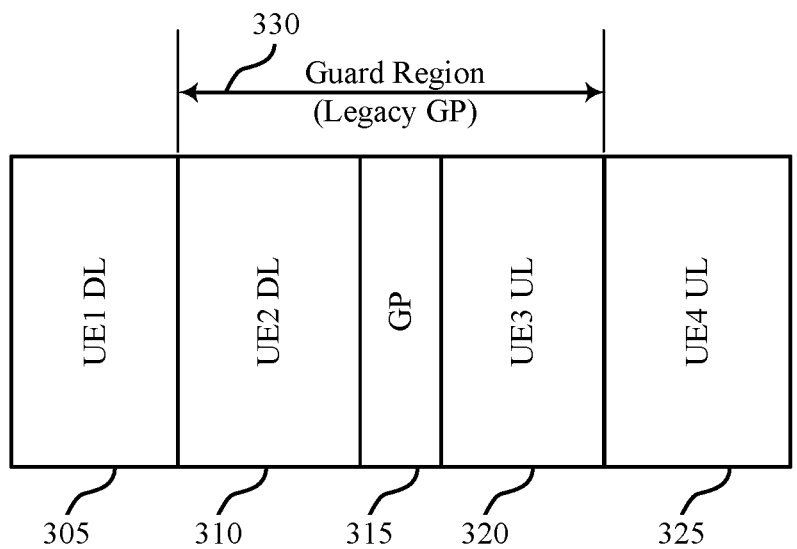
FIG. 3 illustrates an example wireless resources of TDD wireless communications and a guard period in a TDD wireless system that supports guard period modification in a TDD wireless system in accordance with aspects of the present disclosure.

FIG. 3 illustrates an example of wireless resources 300 of TDD wireless communications and a guard period in a TDD wireless system that supports guard period modification in a TDD wireless system in accordance with aspects of the present disclosure. In some cases, the example of FIG. 3 may represent aspects of techniques performed by a UE 115 or base station 105 as described with reference to FIGS. 1-2. In this example, wireless resources 300 may be allocated by a base station (e.g., a serving cell base station such as discussed in FIGS. 1-2) for TDD communications, and may include first downlink resources 305 allocated for downlink transmissions to a first UE (e.g., a UE 115 of FIGS. 1-2), and second downlink resources 310 allocated for downlink transmissions to a second UE (e.g., a UE 115 of FIGS. 1-2). The base station may determine a guard period 315, in accordance with techniques discussed herein, and allocate first uplink resources 320 to a third UE following the guard period 315, and allocate second uplink resources 325 to a fourth UE.

As indicated above, in some examples a base station allocating wireless resources 300 may provide dynamic sizing of the guard period 315 based on TAs of the UEs that are allocated to wireless resources 300. In this example, a single UE may transmit using an entire bandwidth for a particular downlink or uplink allocation. However, in other examples, multiple UEs having similar TAs may transmit using FDM during a same time period. Because the single UEs (or multiple UEs having a similar TA) allocated to resources before and after the guard period have known TAs, the base station may set the duration of guard period 315 based upon the one-way base station to UE delays of the second UE that is allocated to second downlink resources 310 prior to the guard period 315 and the third UE that is allocated to first uplink resources 320 following the guard period 315. This, the duration of the guard period 315 is a function of only the second UE TA and the third UE TA. In examples where the first UE or fourth UE have TAs that exceed the duration of the second downlink resources 310 or first uplink resources 320, the guard period 315 may also account for such a longer TA. Additionally, the guard period 315, in some examples, may be dynamically sized based upon the specific UEs scheduled during the downlink to uplink transition.

In some examples, a guard region 330 may be identified, and the TAs of UEs transmitting during the guard region or adjacent to the guard region may be used for determining the duration of the guard period 315. In some examples, the duration of the guard region 330 may correspond to a duration of a legacy guard period, such as the guard period of a legacy LTE TDD special subframe.

Figure 4:
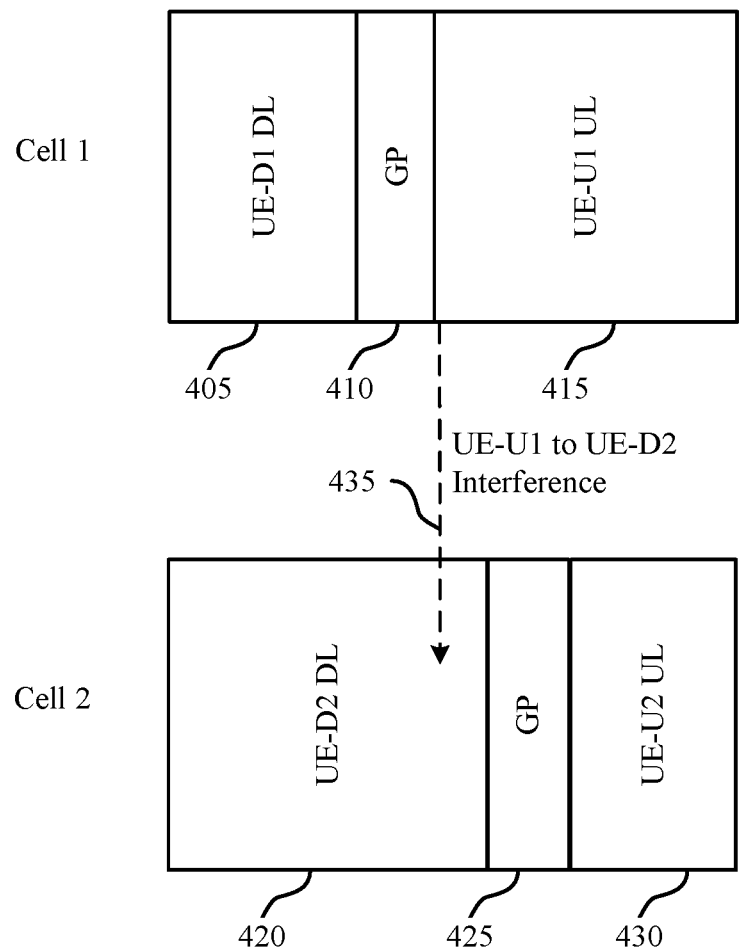
FIG. 4 illustrates an example of wireless resources that may experience inter-cell interference in a TDD wireless system.

FIG. 4 illustrates an example of wireless resources 400 that may experience inter-cell interference in a TDD wireless system. In some cases, the example of FIG. 4 may represent aspects of techniques performed by a UE 115 or base station 105 as described with reference to FIGS. 1-2. In this example, wireless resources 400 may include wireless resources allocated by a first cell (cell 1, or a first base station) and a second cell (cell 2, or a second base station). In this example, the first cell includes first downlink resources 405 allocated to a first downlink UE (UE-D1), a first guard period 410, and first uplink resources 415 allocated to a first uplink UE (UE-U1). Concurrently, the second cell includes second downlink resources 420 allocated to a second downlink UE (UE-D2), a second guard period 425, and second uplink resources 430 allocated to a second uplink UE (UE-U2). In this example, the first cell and second cell allocate resources independently, and the first uplink resources 415 are allocated to begin before the second downlink UE completes reception of a downlink transmission of the second downlink resources 420. Thus, in this example, inter-cell interference 435 is present between the first uplink UE of cell 1 and the second downlink UE of cell 2 (UE-U1 to UE-D2 interference). Accordingly, in some examples, where neighboring base stations are in proximity and are configured such that such inter-cell interference 435 may be possible, a guard line may be established to help prevent such inter-cell interference 435, as will be discussed in more detail with reference to FIG. 5.

Figure 5:
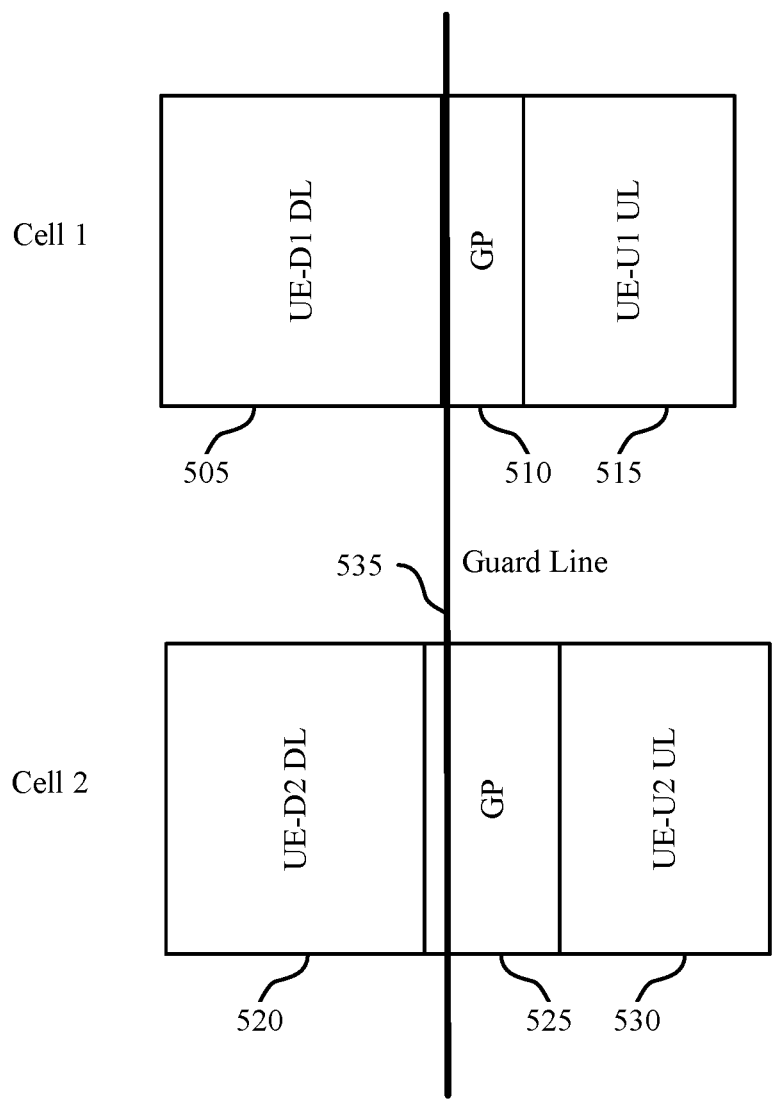
FIG. 5 illustrates an example of wireless resources that are allocated based on a guard line established for neighboring base stations that may experience inter-cell interference in a TDD wireless system in accordance with aspects of the present disclosure.

FIG. 5 illustrates an example of wireless resources 500 that are allocated based on a guard line established for neighboring base stations that may experience inter-cell interference in a TDD wireless system in accordance with aspects of the present disclosure. In some cases, the example of FIG. 5 may represent aspects of techniques performed by a UE 115 or base station 105 as described with reference to FIGS. 1-2. In this example, wireless resources 500 may include wireless resources allocated by a first cell (cell 1, or a first base station) and a second cell (cell 2, or a second base station). In this example, the first cell may allocate first downlink resources 505 allocated to a first downlink UE (UE-D1), a first guard period 510, and first uplink resources 515 allocated to a first uplink UE (UE-U1). Concurrently, the second cell includes second downlink resources 520 allocated to a second downlink UE (UE-D2), a second guard period 525, and second uplink resources 530 allocated to a second uplink UE (UE-U2). In this example, the base stations of the first and second cells (and/or other neighboring base stations) may establish a synchronized guard line 535. Such a guard line 535 may provide that both guard period 510 and guard period 525 may be dynamically configured on a per-cell basis while also avoiding both inter-cell and intra-cell interference. Such a guard line 535 may be common across a number of neighboring base stations, or all base stations of a TDD wireless system. In some examples, the guard line 535 may be established by a core network or through communications among base stations. The guard line 535 may identify a time boundary that neither the downlink nor the uplink allocations can straddle for any base station, and thus help avoid inter-cell interference.

Figure 6:
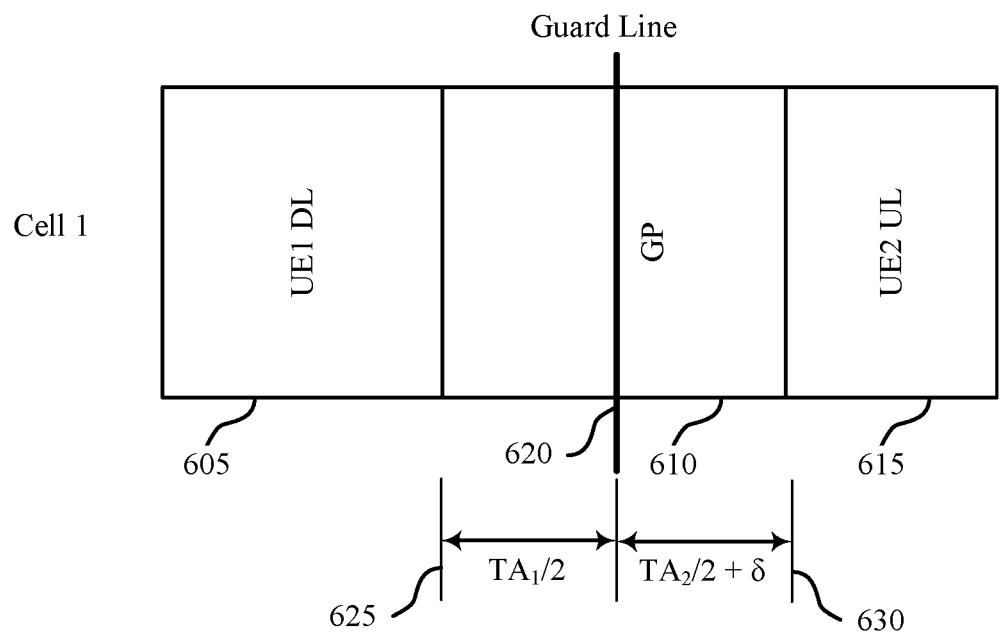
FIG. 6 illustrates an example of guard period determination using a guard line in a TDD wireless system in accordance with aspects of the present disclosure.

FIG. 6 illustrates an example of guard period determination 600 using a guard line in a TDD wireless system in accordance with aspects of the present disclosure. In some cases, the example of FIG. 6 may represent aspects of techniques performed by a UE 115 or base station 105 as described with reference to FIGS. 1-2. In this example, wireless resources may include wireless resources allocated by a first cell (cell 1, or a first base station). In this example, the first cell may allocate first downlink resources 605 allocated to a first downlink UE (UE1), a first guard period 610, and first uplink resources 615 allocated to a first uplink UE (UE2). Guard line 620 may be established for the first cell and one or more neighboring cells.

In this example, the base station of the first cell (and/or other neighboring base stations) may determine resource allocations for the first downlink resources 605 and first uplink resources 615 to provide a duration of guard period 610 that is dynamically adjusted based on TAs of the first uplink UE and the first downlink UE. As indicated above, each UE may identify a TA value that equals the round-trip delay between the serving base station and the UE. The serving base station may retrieve each UE TA value, and may allocate wireless resources according to scheduling rules that help avoid intra-cell interference and also allow for dynamic modification of the guard period 610. In the example of FIG. 6, the first downlink transmission allocated by first downlink resources 605 may be set to have an end time 625 no later than the time of the guard line (GL) less ½ of the first downlink UE's TA (GL−$TA_1$/2). Similarly, the first uplink UE may be allocated to first uplink resources 615 such that the first uplink UE's allocation has a start time 630 that is no sooner than the time GL+$TA_2$/2+δ, where δ corresponds to the first uplink UE startup time including RF and analog warmup times. In some examples, the value of δ is established across the TDD wireless system, although in other examples this value may be determined based on one or more other factors (e.g., class of UE) or may be signaled by the UE. In such a manner, a base station may identify the guard line 620 time, identify TAs for UEs that are to transmit adjacent to the guard period 610, and determine wireless resource allocations to provide a duration of the guard period 610.

Figure 7:
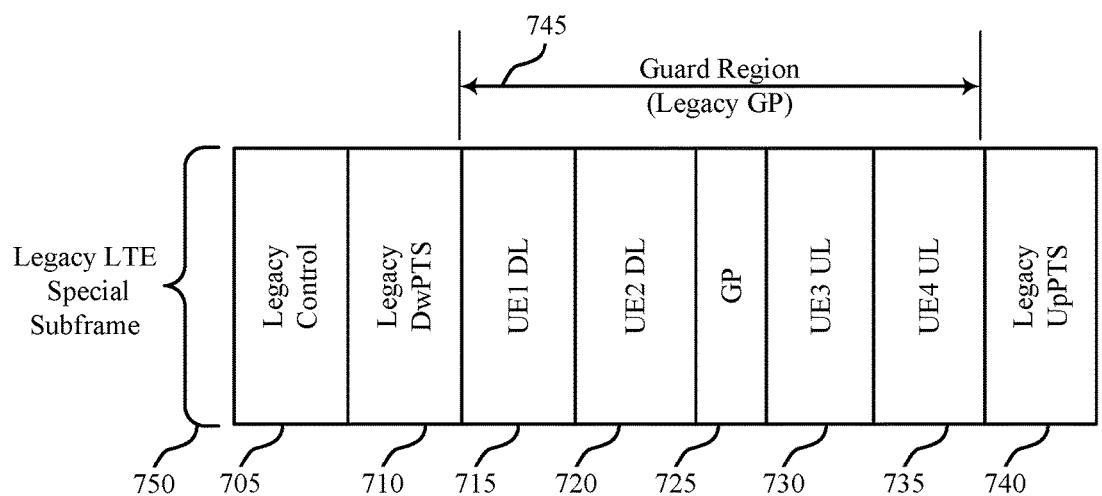
FIG. 7 illustrates an example of a legacy guard period in combination with a modifiable guard period in a TDD wireless system in accordance with aspects of the present disclosure.

FIG. 7 illustrates an example 700 of a legacy guard period in combination with a modifiable guard period in a TDD wireless system in accordance with aspects of the present disclosure. In some cases, the example of FIG. 7 may represent aspects of techniques performed by a UE 115 or base station 105 as described with reference to FIGS. 1-2. In this example, wireless resources for one or more downlink or uplink transmissions may be included within a legacy guard period 745 of a legacy LTE special subframe 750.

In this example, a base station may configure the legacy LTE special subframe 750 to include legacy control information 705, a legacy downlink pilot time slot (DwPTS) 710, and a legacy uplink pilot time slot (UpPTS) 740. According to legacy configurations, legacy guard period 745 may span the time duration between legacy DwPTS 710 and legacy UpPTS 740. In some examples using techniques described herein, a base station may identify the legacy guard period as a guard region 745, and may schedule one or more other uplink or downlink transmissions within the guard region 745 based on TAs of one or more UEs. Thus, a base station in such examples may dynamically schedule additional users to reduce the overhead in guard period duration. Such additional users may include both downlink or uplink users that are near-cell with corresponding small TA values can be scheduled within the guard region 745, and closer to a guard line if one is established between neighboring base stations. In some examples, a UE having a TA that is below a threshold value may be identified as such additional users.

In the example of FIG. 7, a base station may TDM multiple UEs within the guard region 745 to reduce the effective legacy guard period overhead while also maintaining backward compatibility with legacy UEs by using existing legacy DwPTS 710 and legacy UpPTS 740. In this example, a first downlink UE and a second downlink UE may be allocated to first downlink resources 715 and second downlink resources 720, respectively, within the guard region 745. Guard period 725 may be determined based on the TAs of the first downlink UE and second downlink UE, as well as based on TAs of a first uplink UE and a second uplink UE that are allocated to first uplink resources 730 and second uplink resources 735, respectively. In this example, the second downlink UE may have a shorter TA than the first downlink UE, and thus be allocated to the second downlink resources 720 that are closer to guard period 725. Similarly, the first uplink UE may have a shorter TA than the second uplink UE and thus be allocated to the first uplink resources 730 that are closer to guard period 725.

Figure 8:
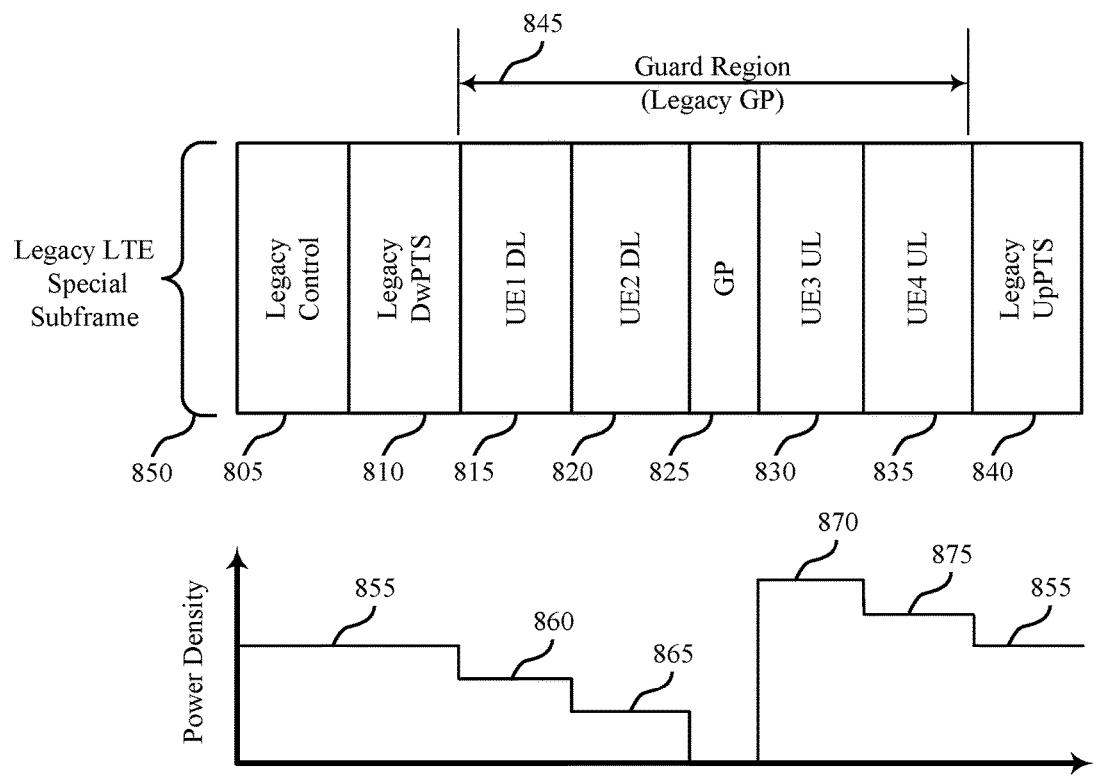
FIG. 8 illustrates an example of power density ramping with a modifiable guard period in a TDD wireless system in accordance with aspects of the present disclosure.

FIG. 8 illustrates an example 800 of power density ramping with a modifiable guard period in a TDD wireless system in accordance with aspects of the present disclosure. In some cases, the example of FIG. 8 may represent aspects of techniques performed by a UE 115 or base station 105 as described with reference to FIGS. 1-2. In this example, similarly as with the example of FIG. 7, wireless resources for one or more downlink or uplink transmissions may be included within a legacy guard period 845 of a legacy LTE special subframe 850.

In this example, similarly as above, a base station may configure the legacy LTE special subframe 850 to include legacy control information 805, a legacy DwPTS 810, and a legacy UpPTS 840. According to legacy configurations, legacy guard period 845 may span the time duration between legacy DwPTS 810 and legacy UpPTS 840. In some examples using techniques described herein, a base station may identify the legacy guard period as a guard region 845, and may schedule one or more other uplink or downlink transmissions within the guard region 845 based on TAs of one or more UEs. In this example, again, a first downlink UE and a second downlink UE may be allocated to first downlink resources 815 and second downlink resources 820, respectively, within the guard region 845. Guard period 825 may be determined based on the TAs of the first downlink UE and second downlink UE, as well as based on TAs of a first uplink UE and a second uplink UE that are allocated to first uplink resources 830 and second uplink resources 835, respectively. In this example, the second downlink UE may have a shorter TA than the first downlink UE, and thus be allocated to the second downlink resources 820 that are closer to guard period 825. Similarly, the first uplink UE may have a shorter TA than the second uplink UE and thus be allocated to the first uplink resources 830 that are closer to guard period 825.

In the example of FIG. 8, power ramping may also be used to help mitigate inter-cell interference in which downlink transmissions for the second downlink resource 820 allocation may interfere with the uplink reception of a neighboring cell following the neighboring cell's guard period. The legacy guard period 845 may help alleviate such interference, but inserting downlink TDM users within the legacy guard period 845 may aggravate such interference in some deployments. In the example of FIG. 8, power ramping to provide reduced downlink power densities is provided to help mitigate such inter-cell interference. Given that the first downlink UE and second downlink UE have relatively small TA values and are near-cell UEs, they can receive at a lower power density level than nominal legacy power density levels 855. In this example, the a first reduced power density level 860 is used for the first downlink UE, and a second further reduced power density level 865 is used for the second downlink UE. Additionally, to help with base station reception of uplink transmissions, the first uplink UE and second uplink UE may transmit at a higher power level, namely a first uplink power density level 870 and a second uplink power density level 875, respectively, than nominal legacy power density levels 855 to enable better base station reception.

In some examples, the power step difference can be aligned with a shortened TTI duration (e.g., a shortened eCC TTI), and a UE may be scheduled in this shortened TTI at a constant power density. In other examples, the TTI of a UE receiving or transmitting may have a longer duration than the power step durations, and a power step may occur on an OFDM symbol transition that is not aligned to the TTI. In such cases, a UE may have a changing power level for the duration of the respective TTI. In some examples, the power step durations and levels may be dynamically signaled, or may be mapped based on timing from a guard line or other time location. In some examples, parameters may be provided for the power steps both in time and level, as well as any changes to the Traffic to Pilot (TPR) ratio.

Figure 9:
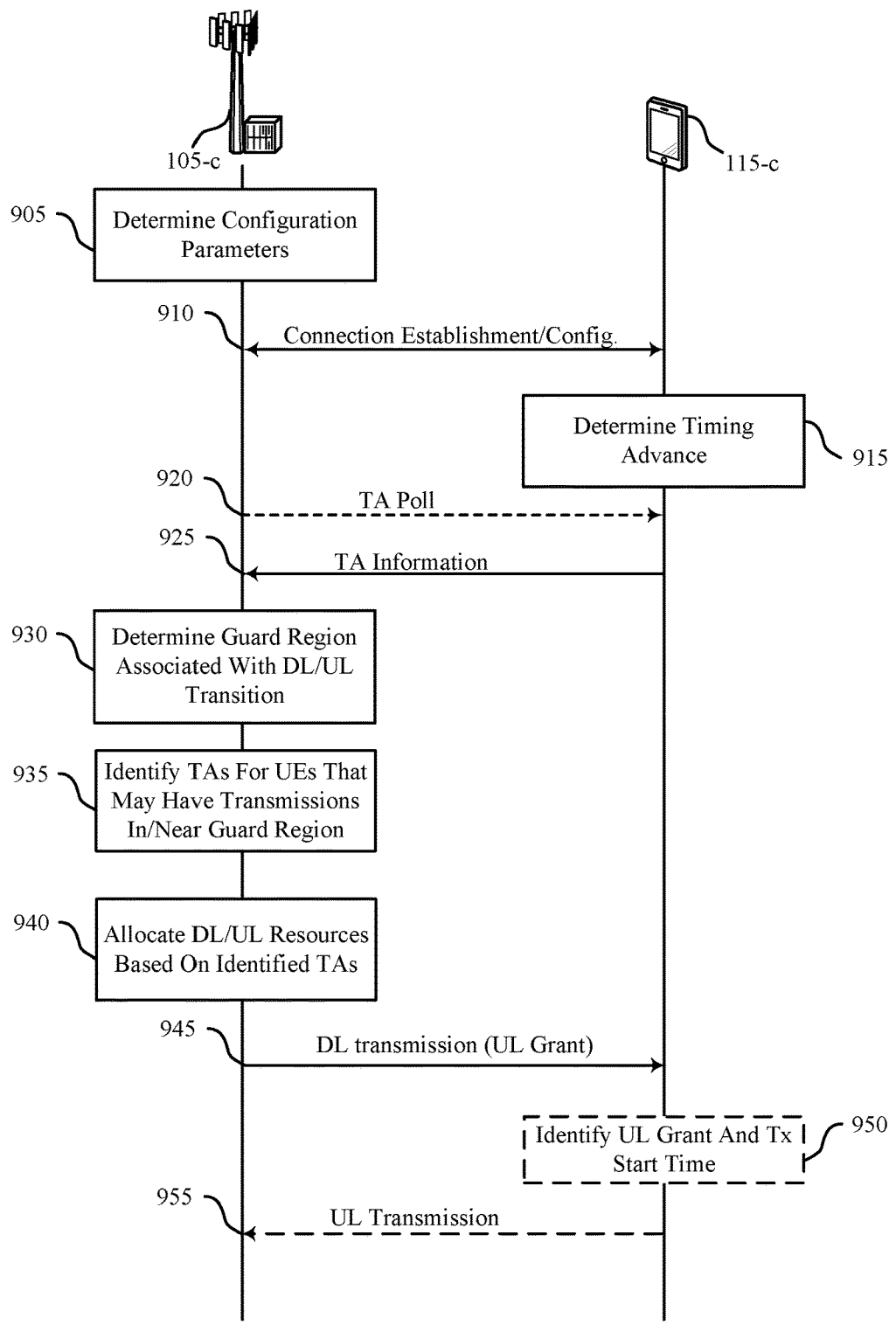
FIG. 9 illustrates an example of a process flow for guard period modification in a TDD wireless system in accordance with aspects of the present disclosure.

FIG. 9 illustrates an example of a process flow 900 for guard period modification in a TDD wireless system in accordance with aspects of the present disclosure. In some cases, process flow 900 may represent aspects of techniques performed by a UE 115 or base station 105 as described with reference to FIGS. 1-8. In the example of FIG. 9, a base station 105-*c* and a UE 115-*c* may modify guard periods for TDD communications based on a TA of UE 115-*c* alone or in combination with one or more other UEs.

In this example, base station 105-*c* may determine configuration parameters, as indicated at block 905. Configuration parameters may include parameters for RRC connections with various UEs, and may also include parameters related to TDD transmissions within a guard region that may allow for communications within one or more UEs within the guard region. The base station 105-*c* and UE 115-*c* may establish a connection 910 and the base station 105-*c* may provide one or more of the determined parameters to the UE 115-*c*.

In examples that provide modification of a guard period, the base station 105-*c* may configure the UE 115-*c* to transmit TA information to the base station 105-*c*. At block 915, the UE 115-*c* may determine its TA. Such a determination may be made according to established TA determination techniques. For example, in some cases base station 105-*c* may provide an initial time advance to UE 115-*c* in a random access response, and the UE 115-*c* may further modify the TA based on one or more pilot signals transmitted by the base station 105-*c*. In other examples, the TA may be determined based on a difference in a time of reception of a transmission at the UE 115-*c* and a time of transmission by the base station 105-*c*. In some examples, the UE 115-*c* may periodically transmit the TA information 925 to the base station 105-*c*, and in other examples the UE may transmit the TA information 925 in response to an optional TA poll 920 from the base station 105-*c*.

At block 930, the base station 105-*c* may determine the guard region associated with a downlink to uplink transition in TDD communications. In some examples, the guard region may be determined based on a legacy guard period of a legacy TDD special subframe. In other examples, the guard region may be determined based on transmissions near the transition between downlink and uplink transmissions.

At block 935, the base station 105-*c* may identify TAs for UEs that may have transmissions in or near the guard region. The base station 105-*c* may identify such UEs, which may include UE 115-*c*, by determining UEs that need downlink resource allocations, uplink resource allocations, or both, and that are capable to receive or transmit communications within the guard region. The base station 105-*c* may also identify the TAs for the identified UEs based on the received TA information from the UEs.

At block 940, the base station 105-*c* may allocate downlink and uplink resources based on the identified TAs. In some examples, the base station 105-*c* may determine that one or more TAs may allow the respective UEs to receive or transmit during the guard region. In some examples, the base station 105-*c* may allocate resources to provide a guard period within the guard region such that based on a guard line that identifies a latest time by which the UE 115-*c* is to complete reception of a downlink transmission, and an earliest time that the UE 115-*c*, or another UE, may start transmitting an uplink transmission. In some cases, the base station 105-*c* may subtract the TA of the UE 115-*c* from the guard line to determine a starting point for the guard period, and add a TA of an uplink UE plus a switching time to the guard line to determine an ending point for the guard period. The base station 105-*c* may then allocate downlink and uplink resources based on the guard period start and end times. The base station 105-*c* may then transmit the downlink transmission 945, which in some examples may include an uplink grant.

At block 950, UE 115-*c* is allocated to uplink resources following the guard period for uplink transmissions, the UE 115-*c* may identify the uplink grant and transmission start time. The UE 115-*c* may, in such cases, determine the allocated uplink resources from the uplink grant, and transmit uplink transmission 955. The uplink transmission 955 may start following the guard period, which the base station 105-*c* determined based on the UE TAs, as discussed above.

Figure 10:
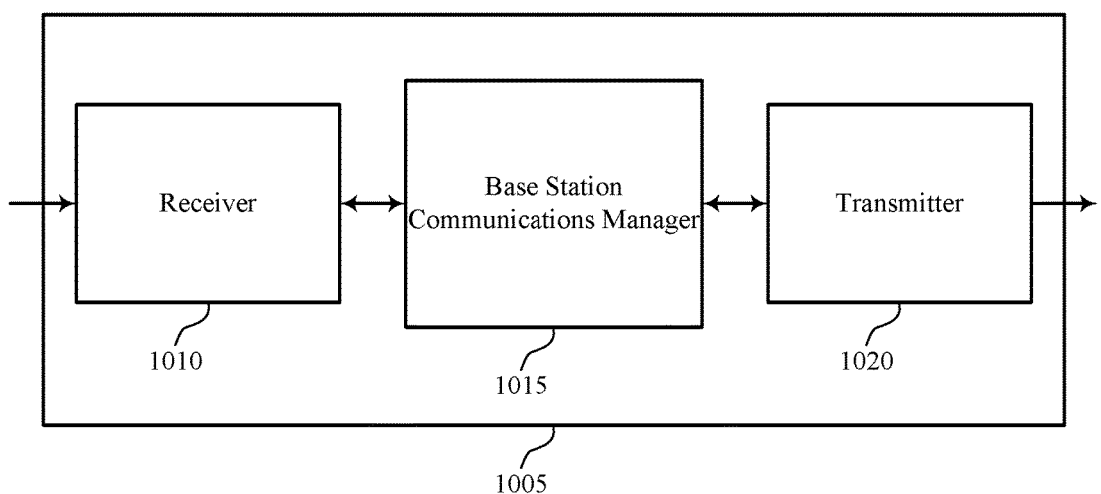
FIGS. 10 and 11 show block diagrams of a wireless device that supports guard period modification in a TDD wireless system in accordance with aspects of the present disclosure.

FIG. 10 shows a block diagram 1000 of a wireless device 1005 that supports guard period modification in a TDD wireless system in accordance with aspects of the present disclosure. Wireless device 1005 may be an example of aspects of a base station 105 as described with reference to FIGS. 1-2. Wireless device 1005 may include receiver 1010, base station communications manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, TA information, and information related to guard period modification in a TDD wireless system, etc.). Information may be passed on to other components of the device. The receiver 1010 may be an example of aspects of the transceiver 1335 described with reference to FIG. 13.

Base station communications manager 1015 may identify a guard region associated with a transition between a downlink transmission and an uplink transmission in a TDD wireless system, identify TAs for the downlink transmission and the uplink transmission adjacent to the guard region, and dynamically adjust a guard period within the guard region based on the identified TAs. The base station communications manager 1015 may also receive TA information from a set of UEs in a TDD wireless system, identify a guard region associated with a transition between a downlink transmission and an uplink transmission in the TDD wireless system, and schedule uplink resource allocations and downlink resource allocations for a subset of UEs adjacent to the guard region based on the received TA information. Base station communications manager 1015 may be an example of aspects of the base station communications manager 1315 described with reference to FIG. 13.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1335 described with reference to FIG. 13. The transmitter 1020 may include a single antenna, or it may include a set of antennas.

Figure 11:
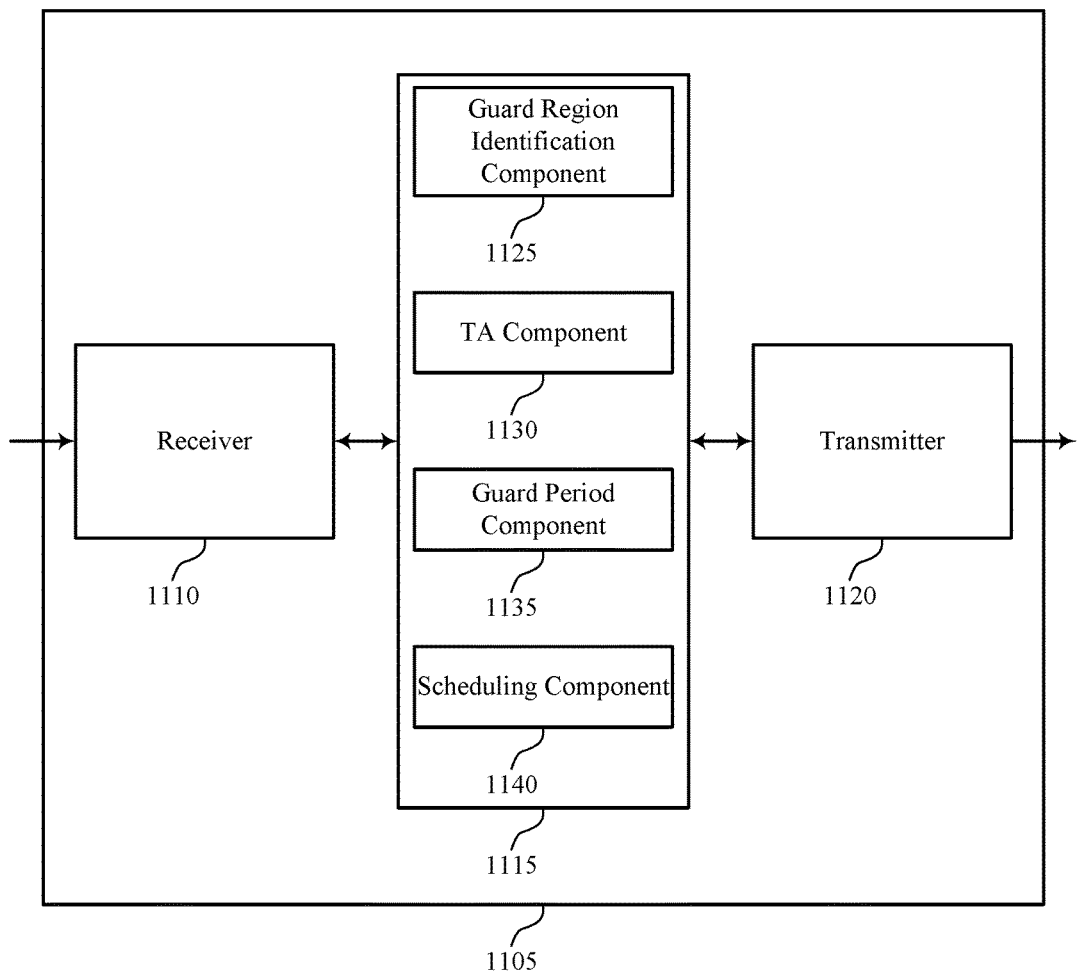

FIG. 11 shows a block diagram 1100 of a wireless device 1105 that supports guard period modification in a TDD wireless system in accordance with aspects of the present disclosure. Wireless device 1105 may be an example of aspects of a wireless device 1005 or a base station 105 as described with reference to FIGS. 1, 2 and 10. Wireless device 1105 may include receiver 1110, base station communications manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, TA information, and information related to guard period modification in a TDD wireless system, etc.). Information may be passed on to other components of the device. The receiver 1110 may be an example of aspects of the transceiver 1335 described with reference to FIG. 13.

Base station communications manager 1115 may also include guard region identification component 1125, TA component 1130, guard period component 1135, and scheduling component 1140. Base station communications manager 1115 may be an example of aspects of the base station communications manager 1315 described with reference to FIG. 13.

Guard region identification component 1125 may identify a guard region associated with a transition between a downlink transmission and an uplink transmission in a TDD wireless system. In some cases, the guard region may correspond to a legacy guard period of the TDD system. In some cases, the guard region is within a TDD special subframe.

TA component 1130 may identify TAs for the downlink transmission and the uplink transmission adjacent to the guard region, receive TA information from a set of UEs in a TDD wireless system, and determine a subset of the set of UEs with TA times at or below a threshold.

Guard period component 1135 may dynamically adjust a guard period within the guard region based on the identified TAs, such as by dynamically adjusting the guard period by determining a start time for the uplink transmission based on the guard line and the TA for the uplink transmission. In some cases, dynamically adjusting the guard period may include determining an end time for the downlink transmission based on the guard line and the TA for the downlink transmission. In some cases, a guard period within the guard region is dynamically adjusted based on the TA information from the set of UEs.

Scheduling component 1140 may schedule uplink resource allocations and downlink resource allocations for one or more UEs to receive the downlink transmission or transmit the uplink transmission outside of the guard period and within the guard region. In some examples, the scheduling component 1140 may schedule uplink resource allocations and downlink resource allocations for one or more UEs to receive the downlink transmission or transmit the uplink transmission based on the identified TAs, determine that a first downlink UE has a shorter TA than a second downlink UE, allocate a first subset of downlink resources to the first downlink UE and a second subset of downlink resources to the second downlink UE, the first subset of downlink resources being closer in time to the guard period than the second subset of downlink resources. Similarly, the scheduling component 1140 may determine that a first uplink UE has a shorter TA than a second uplink UE, allocate a first subset of uplink resources to the first uplink UE and a second subset of uplink resources to the second uplink UE, the first subset of uplink resources being closer in time to the guard period than the second subset of uplink resources. The scheduling component 1140 also may schedule uplink resource allocations and downlink resource allocations for one or more UEs to receive the downlink transmission or transmit the uplink transmission outside of the guard region, allocate downlink resources based on the end time for the downlink transmission, allocate uplink resources based on the start time for the uplink transmission, and schedule uplink resource allocations and downlink resource allocations for a subset of UEs adjacent to the guard region based on the received TA information.

In some cases, the scheduling component 1140 may schedule uplink resource allocations and downlink resource allocations for a subset of UEs to be closer to a guard period within the guard region with TA times at or below a threshold than uplink resource allocations and downlink resource allocations for UEs with TA times above the threshold. In some cases, two or more UEs may be allocated to resources within a legacy guard period of a legacy TDD special subframe. In some cases, scheduling the uplink resource allocations and downlink resource allocations for the subset of UEs further includes frequency division multiplexing two or more UEs of the subset of UEs having similar TA values. In some cases, the guard region is within a TDD special subframe, and where scheduling the downlink resource allocations includes: allocating resources for at least one UE of the subset of UEs following a downlink pilot time slot (DwPTS) of the TDD special subframe. In some cases, scheduling the downlink resource allocations further includes: allocating resources for at least one UE of the subset of UEs prior to an uplink pilot time slot (UpPTS) of the TDD special subframe. In some cases, the TA information is used to selectively schedule users in a way that limits intra-cell and inter-cell interference and shortens the guard period overhead to increase the capacity of the TDD wireless system.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1335 described with reference to FIG. 13. The transmitter 1120 may include a single antenna, or it may include a set of antennas.

Figure 12:
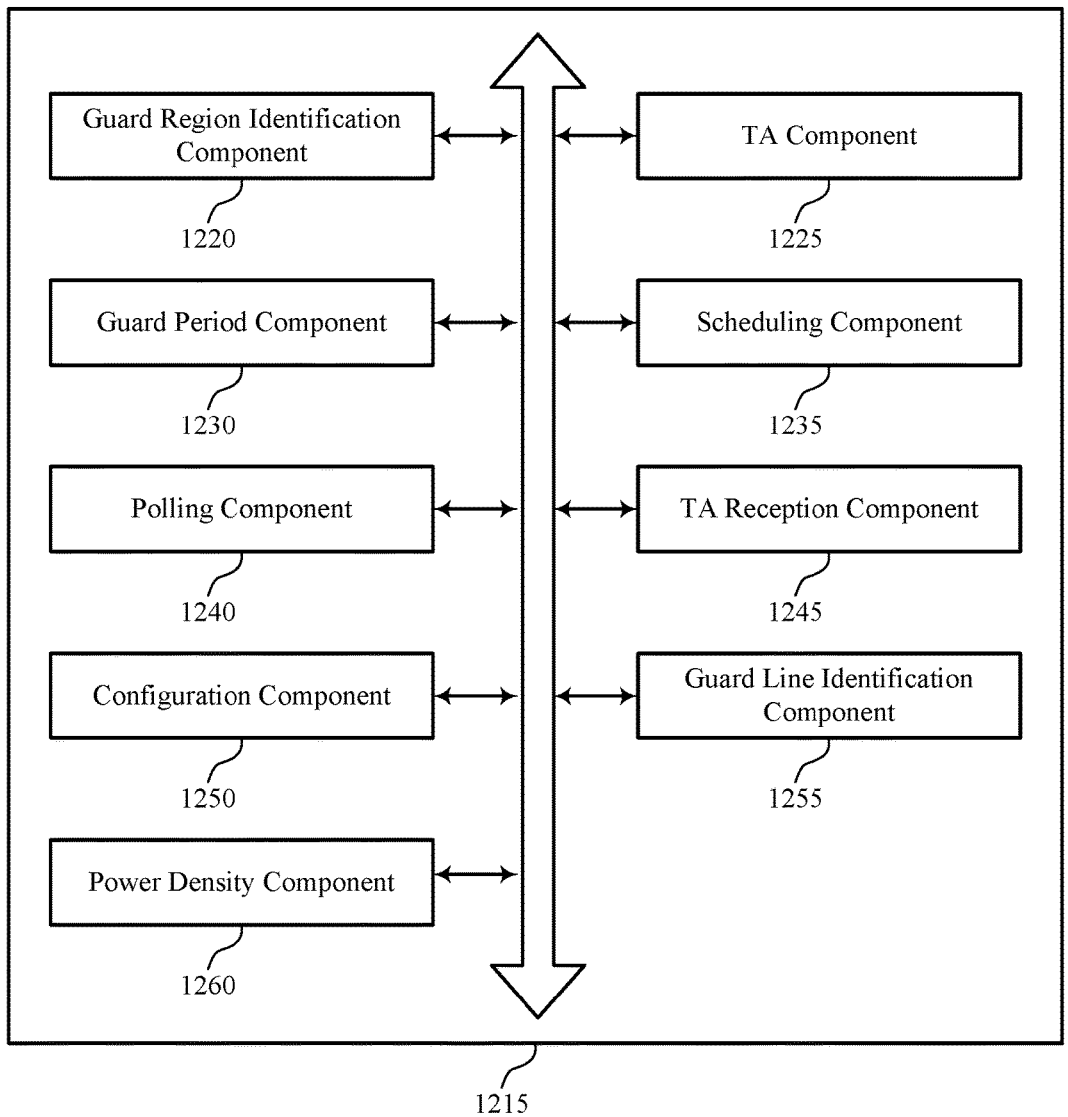
FIG. 12 shows a block diagram of a base station communications manager that supports guard period modification in a TDD wireless system in accordance with aspects of the present disclosure.

FIG. 12 shows a block diagram 1200 of a base station communications manager 1215 that supports guard period modification in a TDD wireless system in accordance with aspects of the present disclosure. The base station communications manager 1215 may be an example of aspects of a base station communications manager 1015, a base station communications manager 1115, or a base station communications manager 1315 described with reference to FIGS. 10, 11, and 13. The base station communications manager 1215 may include guard region identification component 1220, TA component 1225, guard period component 1230, scheduling component 1235, polling component 1240, TA reception component 1245, configuration component 1250, guard line identification component 1255, and power density component 1260. Each of these modules may communicate, directly or indirectly, with one another (e.g., via one or more buses).

Guard region identification component 1220 may identify a guard region associated with a transition between a downlink transmission and an uplink transmission in a TDD wireless system and identify a guard region associated with a transition between a downlink transmission and an uplink transmission in the TDD wireless system. In some cases, the guard region corresponds to a legacy guard period of the TDD wireless system. In some cases, the guard region is within a TDD special subframe.

TA component 1225 may identify timing advances (TAs) for the downlink transmission and the uplink transmission adjacent to the guard region, receive TA information from a set of user equipment (UEs) in a TDD wireless system, and determine a subset of the set UEs with TA times at or below a threshold.

Guard period component 1230 may dynamically adjust a guard period within the guard region based on the identified TAs and dynamically adjust the guard period by determining a start time for the uplink transmission based on the guard line and the TA for the uplink transmission. In some cases, dynamically adjusting the guard period includes: determining an end time for the downlink transmission based on the guard line and the TA for the downlink transmission. In some cases, a guard period within the guard region is dynamically adjusted based on the TA information from the set of UEs.

Scheduling component 1235 may schedule uplink resource allocations and downlink resource allocations for one or more UEs to receive the downlink transmission or transmit the uplink transmission outside of the guard period and within the guard region, schedule uplink resource allocations and downlink resource allocations for one or more UEs to receive the downlink transmission or transmit the uplink transmission based on the identified TAs. In some cases, scheduling the uplink resource allocations and downlink resource allocations for the subset of UEs further includes: frequency division multiplexing two or more UEs of the subset of UEs having similar TA values.

Polling component 1240 may poll the set of UEs for the TA information. In some cases, the identifying TAs includes: polling a set of user equipment devices for associated TAs.

TA reception component 1245 may receive periodic transmissions including the TA information from the set of UEs. In some cases, the identifying TAs includes: receiving periodic transmissions from a set of UEs, the periodic transmissions including TA information for the UEs. In some cases, the TA information is transmitted in an information element in a PUCCH transmission. In some cases, the TA information is received in an information element in a control channel transmission received from the UE. Configuration component 1250 may configure the set of UEs to periodically transmit the TA information via RRC signaling.

Guard line identification component 1255 may identify a guard line, such as through communications with one or more neighboring wireless devices or base stations. In some cases, the guard line identifies a latest time by which a UE that is to receive the downlink transmission is to complete reception of the downlink transmission, and an earliest time that a UE may start transmitting the uplink transmission. In some cases, the guard line is identified for a set of neighboring base stations of the TDD wireless system.

Power density component 1260 may dynamically adjust a power density for transmissions adjacent to the guard region based on the identified TAs. In some cases, the power density is adjusted for a duration of a TTI of the downlink transmission or the uplink transmission. In some cases, the power density is adjusted for a duration of an orthogonal frequency division multiplexing (OFDM) symbol of the downlink transmission or the uplink transmission based on a location of the OFDM symbol relative to the guard period. In some cases, the power density for transmissions adjacent to the guard region is mapped based on a location of wireless resources used for the transmissions relative to the guard period. In some cases, the power density for transmissions adjacent to the guard region is signaled prior to the transmissions. In some cases, the signaling indicates one or more of power steps in time or changes to a traffic-to-pilot ratio (TPR) in time.

Figure 13:
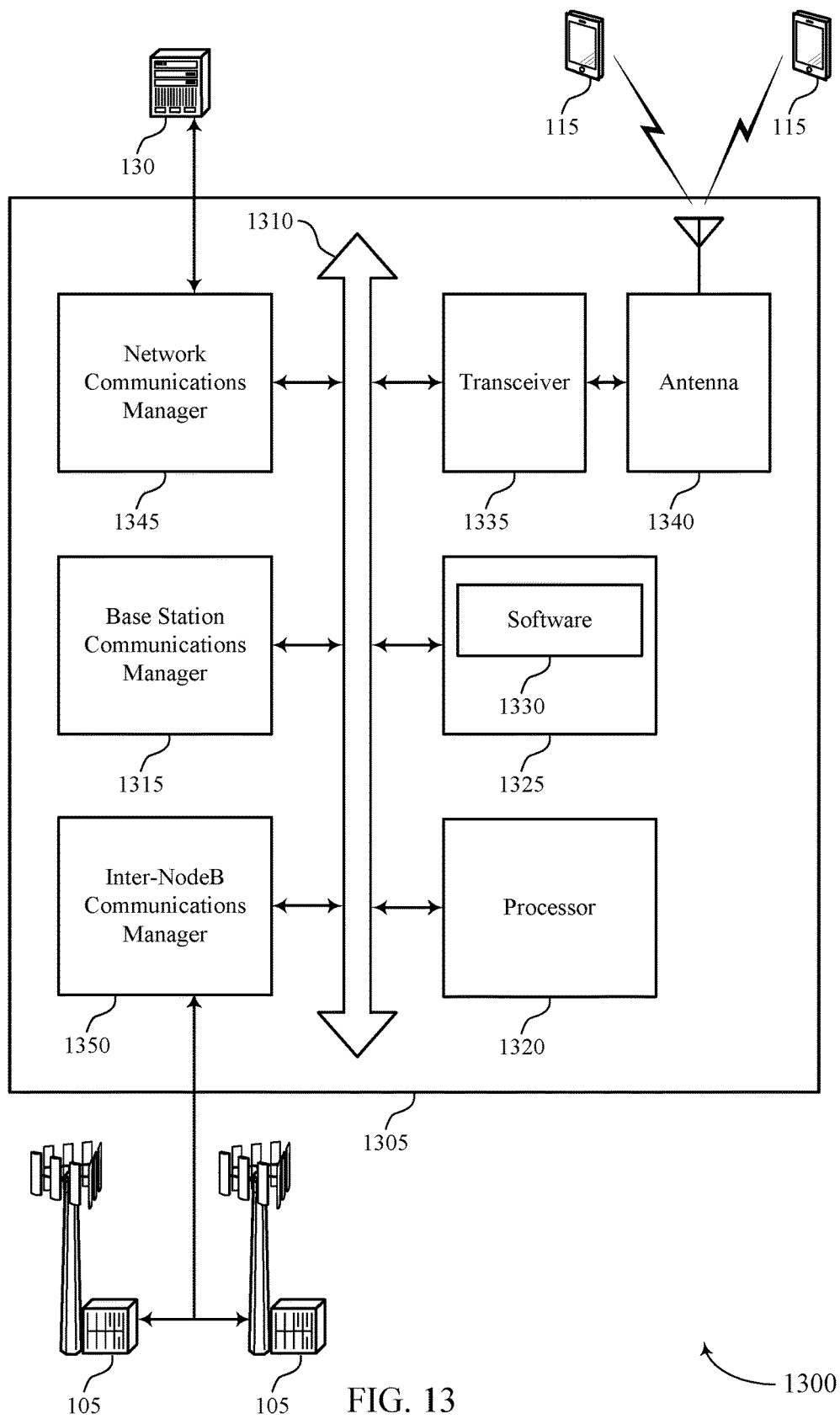
FIG. 13 shows a block diagram of a system including a device (e.g., a base station) that supports guard period modification in a TDD wireless system in accordance with aspects of the present disclosure.

FIG. 13 shows a block diagram of a system 1300 including a device 1305 (e.g., a base station) that supports guard period modification in a TDD wireless system in accordance with aspects of the present disclosure. Device 1305 may be an example of or include the components of wireless device 1005, wireless device 1105, or a base station 105 as described above, e.g., with reference to FIGS. 1, 2, 10, and 11. Device 1305 may include components for bi-directional voice and data communications including components for transmitting and receiving communications, including base station communications manager 1315, processor 1320, memory 1325, software 1330, transceiver 1335, antenna 1340, and network communications manager 1345, and inter-NodeB communications manager 1350.

Base station communications manager 1315 may be an example of aspects of a base station communications manager 1015, 1115, and 1215 described with reference to FIGS. 10, 11, and 12.

Processor 1320 may include an intelligent hardware device, (e.g., a general-purpose processor, a digital signal processor (DSP), a central processing unit (CPU), a microcontroller, an application specific integrated circuit (ASIC), a field-programmable gate array (FPGA), a programmable logic device, a discrete gate or transistor logic component, a discrete hardware component, or any combination thereof). In some cases, processor 1320 may be configured to operate a memory array using a memory controller. In other cases, a memory controller may be integrated into processor 1320. Processor 1320 may be configured to execute computer-readable instructions stored in a memory to perform various functions (e.g., functions or tasks supporting guard period modification in a TDD wireless system).

Memory 1325 may include random access memory (RAM) and read only memory (ROM). The memory 1325 may store computer-readable, computer-executable software 1330 including instructions that, when executed, cause the processor to perform various functions described herein. In some cases, the memory 1325 may contain, among other things, a Basic Input-Output system (BIOS) which may control basic hardware and/or software operation such as the interaction with peripheral components or devices.

Software 1330 may include code to implement aspects of the present disclosure, including code to support guard period modification in a TDD wireless system. Software 1330 may be stored in a non-transitory computer-readable medium such as system memory or other memory. In some cases, the software 1330 may not be directly executable by the processor but may cause a computer (e.g., when compiled and executed) to perform functions described herein.

Transceiver 1335 may communicate bi-directionally, via one or more antennas, wired, or wireless links as described above. For example, the transceiver 1335 may represent a wireless transceiver and may communicate bi-directionally with another wireless transceiver. The transceiver 1335 may also include a modem to modulate the packets and provide the modulated packets to the antennas for transmission, and to demodulate packets received from the antennas.

In some cases, the wireless device may include a single antenna 1340. However, in some cases the device may have more than one antenna 1340, which may be capable of concurrently transmitting or receiving multiple wireless transmissions.

Network communications manager 1345 may manage communications with the core network 130 (e.g., via one or more wired backhaul links). For example, the network communications manager 1345 may manage the transfer of data communications for client devices, such as one or more UEs 115.

Inter-NodeB communications manager 1350 may manage communications with other base station 105, and may include a controller or scheduler for controlling communications with UEs 115 in cooperation with other base stations 105. For example, the inter-NodeB communications manager 1350 may coordinate scheduling for transmissions to UEs 115 for various interference mitigation techniques and guard period modification techniques. In some examples, inter-NodeB communications manager 1350 may provide an X2 interface within an LTE/LTE-A wireless communication network technology to provide communication between base stations 105.

Figure 14:
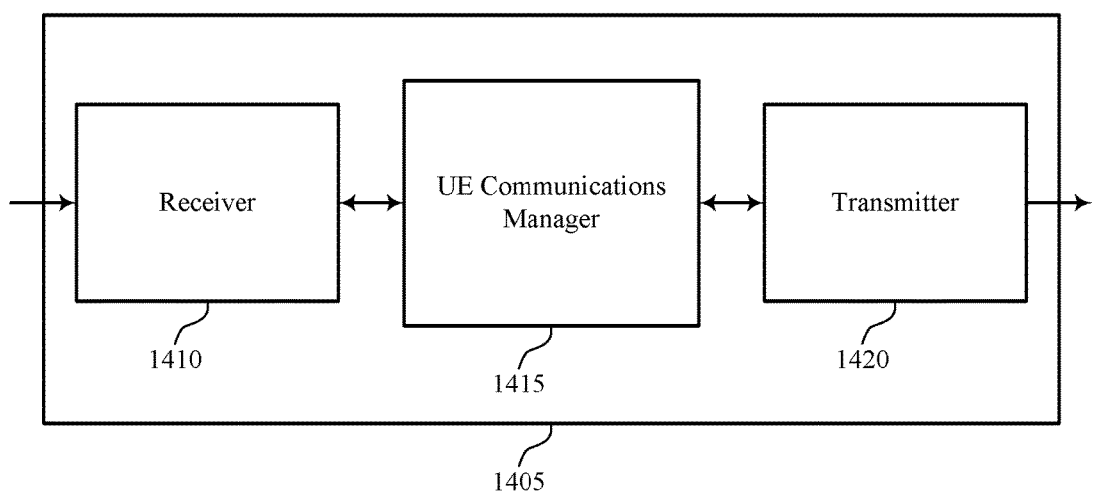
FIGS. 14 and 15 show block diagrams of a wireless device that supports guard period modification in a TDD wireless system in accordance with aspects of the present disclosure.

FIG. 14 shows a block diagram 1400 of a wireless device 1405 that supports guard period modification in a TDD wireless system in accordance with aspects of the present disclosure. Wireless device 1405 may be an example of aspects of a UE 115 as described with reference to FIG. 1. Wireless device 1405 may include receiver 1410, UE communications manager 1415, and transmitter 1420. Wireless device 1405 may also include a processor. Each of these components may be in communication with one another (e.g., via one or more buses).

Receiver 1410 may receive information such as packets, user data, or control information associated with various information channels (e.g., control channels, data channels, and information related to guard period modification in a TDD wireless system, etc.). Information may be passed on to other components of the device. The receiver 1410 may be an example of aspects of the transceiver 1735 described with reference to FIG. 17.

UE communications manager 1415 may be an example of aspects of the UE communications manager 1715 described with reference to FIG. 17.

UE communications manager 1415 may identify a guard region associated with a transition between a downlink transmission and an uplink transmission in a TDD wireless system, determine a TA for communications with a base station in the TDD wireless system, transmit the TA to the base station, and receive, from the base station, a resource allocation having a location relative to the guard region that is determined based on the TA.

Transmitter 1420 may transmit signals generated by other components of the device. In some examples, the transmitter 1420 may be collocated with a receiver 1410 in a transceiver module. For example, the transmitter 1420 may be an example of aspects of the transceiver 1735 described with reference to FIG. 17. The transmitter 1420 may include a single antenna, or it may include a set of antennas.

Figure 15:
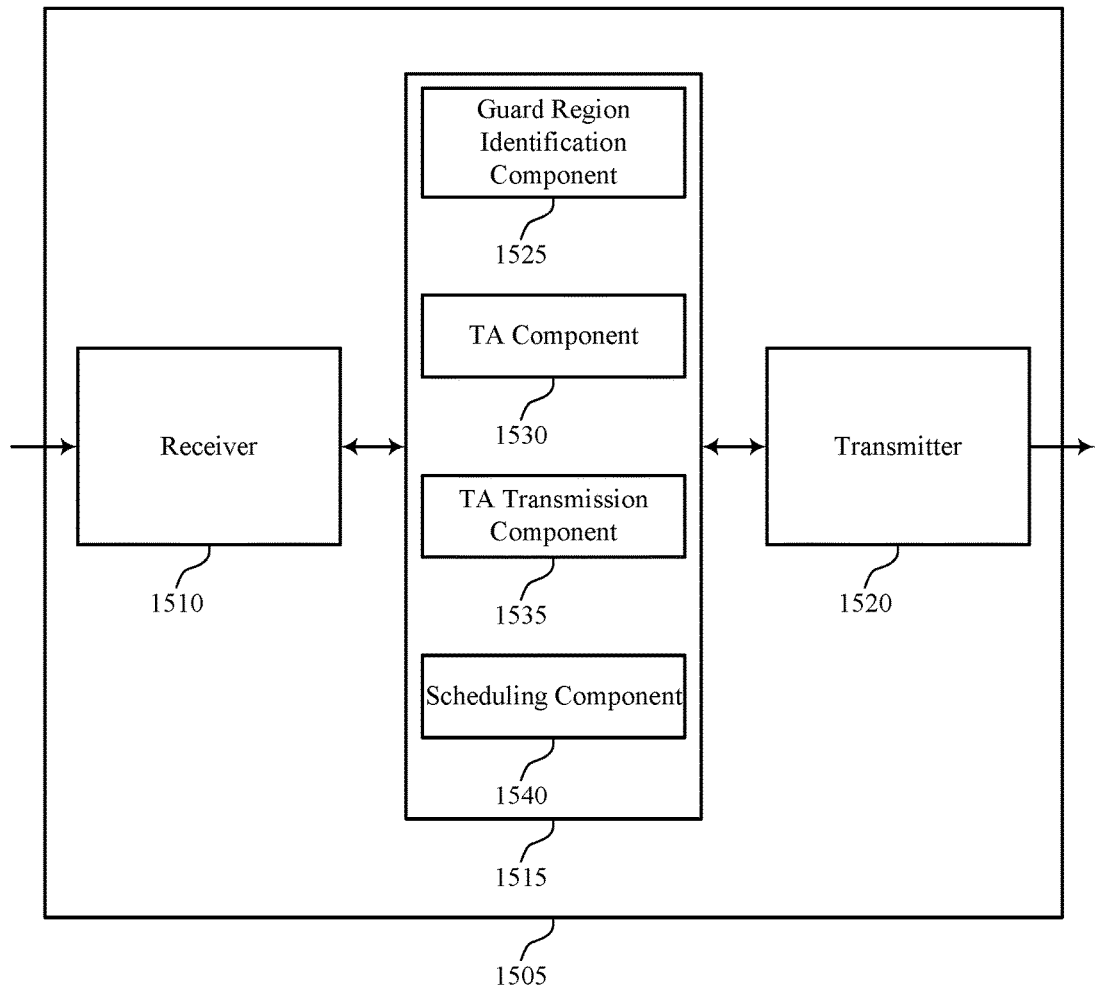

FIG. 15 shows a block diagram 1500 of a wireless device 1505 that supports guard period modification in a TDD wireless system in accordance with aspects of the present disclosure. Wireless device 1505 may be an example of aspects of a wireless device 1405 or a UE 115 as described with reference to FIGS. 1, 2, and 14. Wireless device 1505 may include receiver 1510, UE communications manager 1515, and transmitter 1520. Wireless device 1505 may also include a processor. Each of these components may be in communication with one another (e.g., via one or more buses).

Receiver 1510 may receive information such as packets, user data, or control information associated with various information channels (e.g., control channels, data channels, and information related to guard period modification in a TDD wireless system, etc.). Information may be passed on to other components of the device. The receiver 1510 may be an example of aspects of the transceiver 1735 described with reference to FIG. 17.

UE communications manager 1515 may be an example of aspects of the UE communications manager 1715 described with reference to FIG. 17. UE communications manager 1515 may also include guard region identification component 1525, TA component 1530, TA transmission component 1535, and scheduling component 1540.

Guard region identification component 1525 may identify a guard region associated with a transition between a downlink transmission and an uplink transmission in a TDD wireless system. In some cases, the guard region is within a TDD special subframe of the TDD wireless system, and where the resource allocation is a downlink resource allocation scheduled following a downlink pilot time slot (DwPTS) of the TDD special subframe. In some cases, the guard region is within a TDD special subframe of the TDD wireless system, and where the resource allocation is an uplink resource allocation scheduled prior to an uplink pilot time slot (UpPTS) of the TDD special subframe.

TA component 1530 may determine a TA for communications with a base station in the TDD wireless system and determine the TA and transmitting the TA are performed periodically. In some cases, a periodicity of determining the TA and transmitting the TA is configured by the base station via RRC signaling.

TA transmission component 1535 may transmit the TA to the base station. In some cases, the TA is transmitted in an information element in a control channel transmission to the base station.

Scheduling component 1540 may receive, from the base station, a resource allocation having a location relative to the guard region that is determined based on the TA. In some cases, the resource allocation includes a frequency division multiplexed resource allocation with one or more other transmitters.

Transmitter 1520 may transmit signals generated by other components of the device. In some examples, the transmitter 1520 may be collocated with a receiver 1510 in a transceiver module. For example, the transmitter 1520 may be an example of aspects of the transceiver 1735 described with reference to FIG. 17. The transmitter 1520 may include a single antenna, or it may include a set of antennas.

Figure 16:
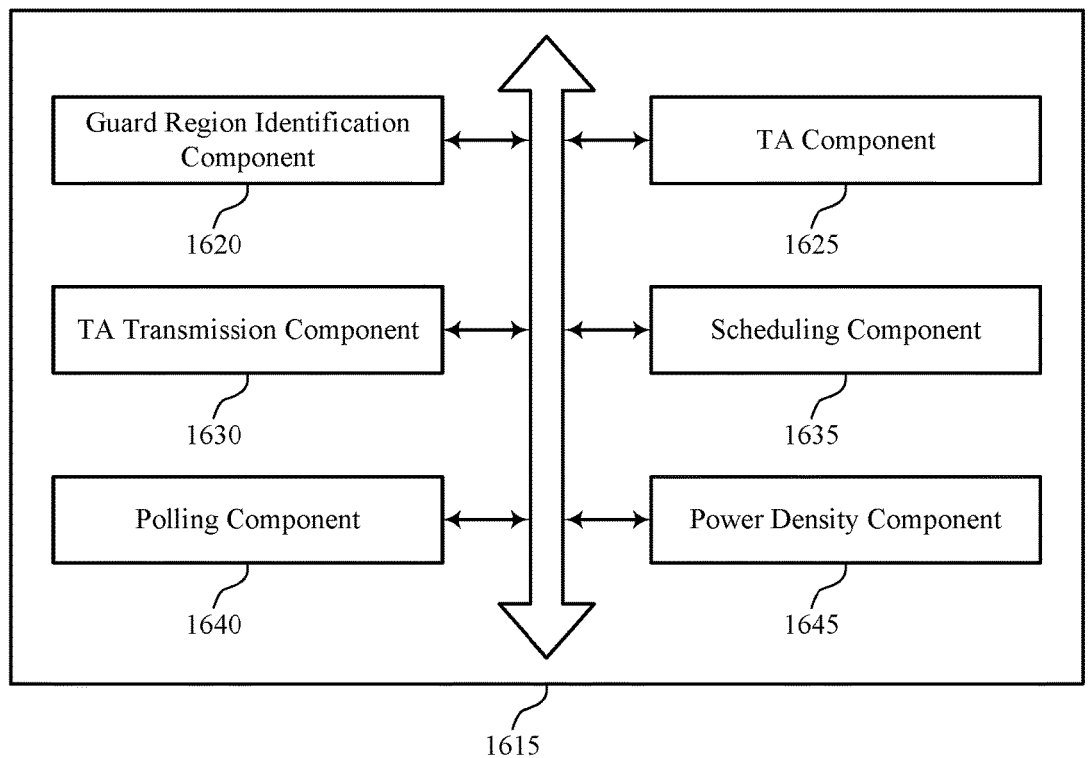
FIG. 16 shows a block diagram of a UE communications manager that supports guard period modification in a TDD wireless system in accordance with aspects of the present disclosure.

FIG. 16 shows a block diagram 1600 of a UE communications manager 1615 that supports guard period modification in a TDD wireless system in accordance with aspects of the present disclosure. The UE communications manager 1615 may be an example of aspects of a UE communications manager 1415, 1515, and 1715 described with reference to FIGS. 14, 15, and 17. The UE communications manager 1615 may include guard region identification component 1620, TA component 1625, TA transmission component 1630, scheduling component 1635, polling component 1640, and power density component 1645. Each of these modules may communicate, directly or indirectly, with one another (e.g., via one or more buses).

Guard region identification component 1620 may identify a guard region associated with a transition between a downlink transmission and an uplink transmission in a TDD wireless system. In some cases, the guard region is within a TDD special subframe of the TDD wireless system, and where the resource allocation is a downlink resource allocation scheduled following a downlink pilot time slot (DwPTS) of the TDD special subframe. In some cases, the guard region is within a TDD special subframe of the TDD wireless system, and where the resource allocation is an uplink resource allocation scheduled prior to an uplink pilot time slot (UpPTS) of the TDD special subframe.

TA component 1625 may determine a TA for communications with a base station in the TDD system and determine the TA and transmitting the TA are performed periodically. In some cases, a periodicity of determining the TA and transmitting the TA is configured by the base station via RRC signaling.

TA transmission component 1630 may transmit the TA to the base station. In some cases, the TA is transmitted in an information element in a control channel transmission to the base station.

Scheduling component 1635 may receive, from the base station, a resource allocation having a location relative to the guard region that is determined based on the TA. In some cases, the resource allocation includes a frequency division multiplexed resource allocation with one or more other transmitters.

Polling component 1640 may receive a TA polling request from the base station, and where determining the TA and transmitting the TA are performed responsive to the polling request.

Power density component 1645 may modify power density for transmitted signals, determine power density for decoding of received signals, or combinations thereof. In some cases, the resource allocation further includes a power density adjustment based on the TA. In some cases, the power density is adjusted for a duration of a TTI of the resource allocation. In some cases, the power density is adjusted for a duration of an orthogonal frequency division multiplexing (OFDM) symbol of the resource allocation based on a location of the OFDM symbol relative to the guard region. In some cases, the power density is adjusted based on a mapping of a location of resources within the resource allocation relative to the guard region. In some cases, the power density is received in signaling associated with the resource allocation. In some cases, the signaling indicates one or more of power steps in time or changes to a traffic-to-pilot ratio (TPR) in time.

Figure 17:
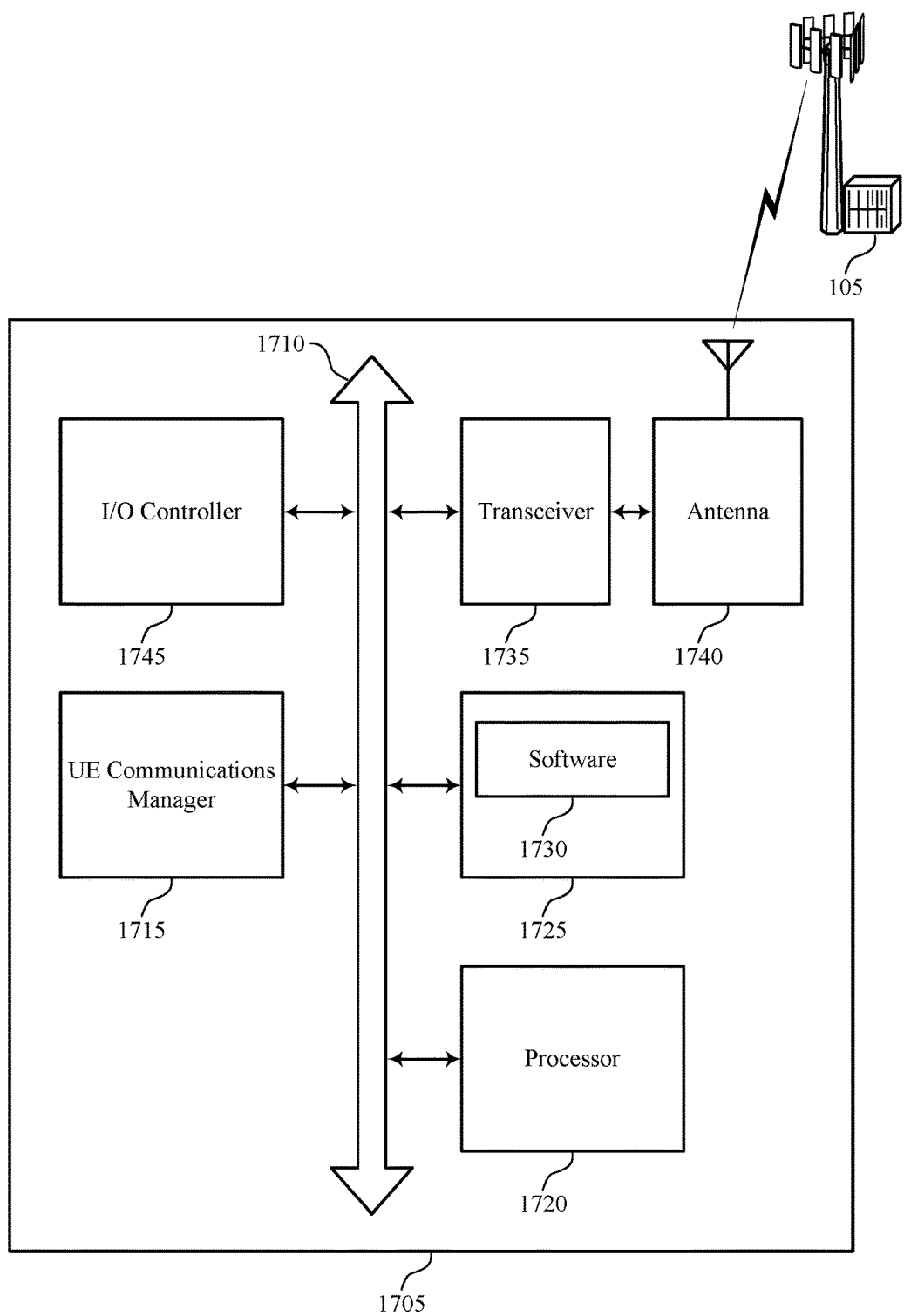
FIG. 17 illustrates a block diagram of a system including a device (e.g., a UE) that supports guard period modification in a TDD wireless system in accordance with aspects of the present disclosure.

FIG. 17 shows a block diagram of a system 1700 including a device 1705 (e.g., a UE) that supports guard period modification in a TDD wireless system in accordance with aspects of the present disclosure. Device 1705 may be an example of or include the components of UE 115 as described above, e.g., with reference to FIGS. 1 and 2. Device 1705 may include components for bi-directional voice and data communications including components for transmitting and receiving communications, including UE communications manager 1715, processor 1720, memory 1725, software 1730, transceiver 1735, antenna 1740, and I/O controller 1745.

UE communications manager 1715 may be an example of aspects of a UE communications manager 1415, 1515, and 1615 described with reference to FIGS. 14, 15, and 16.

Processor 1720 may include an intelligent hardware device, (e.g., a general-purpose processor, a digital signal processor (DSP), a central processing unit (CPU), a microcontroller, an application specific integrated circuit (ASIC), a field-programmable gate array (FPGA), a programmable logic device, a discrete gate or transistor logic component, a discrete hardware component, or any combination thereof). In some cases, processor 1720 may be configured to operate a memory array using a memory controller. In other cases, a memory controller may be integrated into processor 1720. Processor 1720 may be configured to execute computer-readable instructions stored in a memory to perform various functions (e.g., functions or tasks supporting guard period modification in a TDD wireless system).

Memory 1725 may include random access memory (RAM) and read only memory (ROM). The memory 1725 may store computer-readable, computer-executable software 1730 including instructions that, when executed, cause the processor to perform various functions described herein. In some cases, the memory 1725 may contain, among other things, a Basic Input-Output system (BIOS) which may control basic hardware and/or software operation such as the interaction with peripheral components or devices.

Software 1730 may include code to implement aspects of the present disclosure, including code to support guard period modification in a TDD wireless system. Software 1730 may be stored in a non-transitory computer-readable medium such as system memory or other memory. In some cases, the software 1730 may not be directly executable by the processor but may cause a computer (e.g., when compiled and executed) to perform functions described herein.

Transceiver 1735 may communicate bi-directionally, via one or more antennas, wired, or wireless links as described above. For example, the transceiver 1735 may represent a wireless transceiver and may communicate bi-directionally with another wireless transceiver. The transceiver 1735 may also include a modem to modulate the packets and provide the modulated packets to the antennas for transmission, and to demodulate packets received from the antennas.

In some cases, the wireless device may include a single antenna 1740. However, in some cases the device may have more than one antenna 1740, which may be capable of concurrently transmitting or receiving multiple wireless transmissions.

I/O controller 1745 may manage input and output signals for device 1705. I/O controller 1745 may also manage peripherals not integrated into device 1705. In some cases, I/O controller 1745 may represent a physical connection or port to an external peripheral. In some cases, I/O controller 1745 may utilize an operating system such as iOS®, ANDROID®, MS-DOS®, MS-WINDOWS®, OS/2®, UNIX®, LINUX®, or another known operating system.

Figure 18:
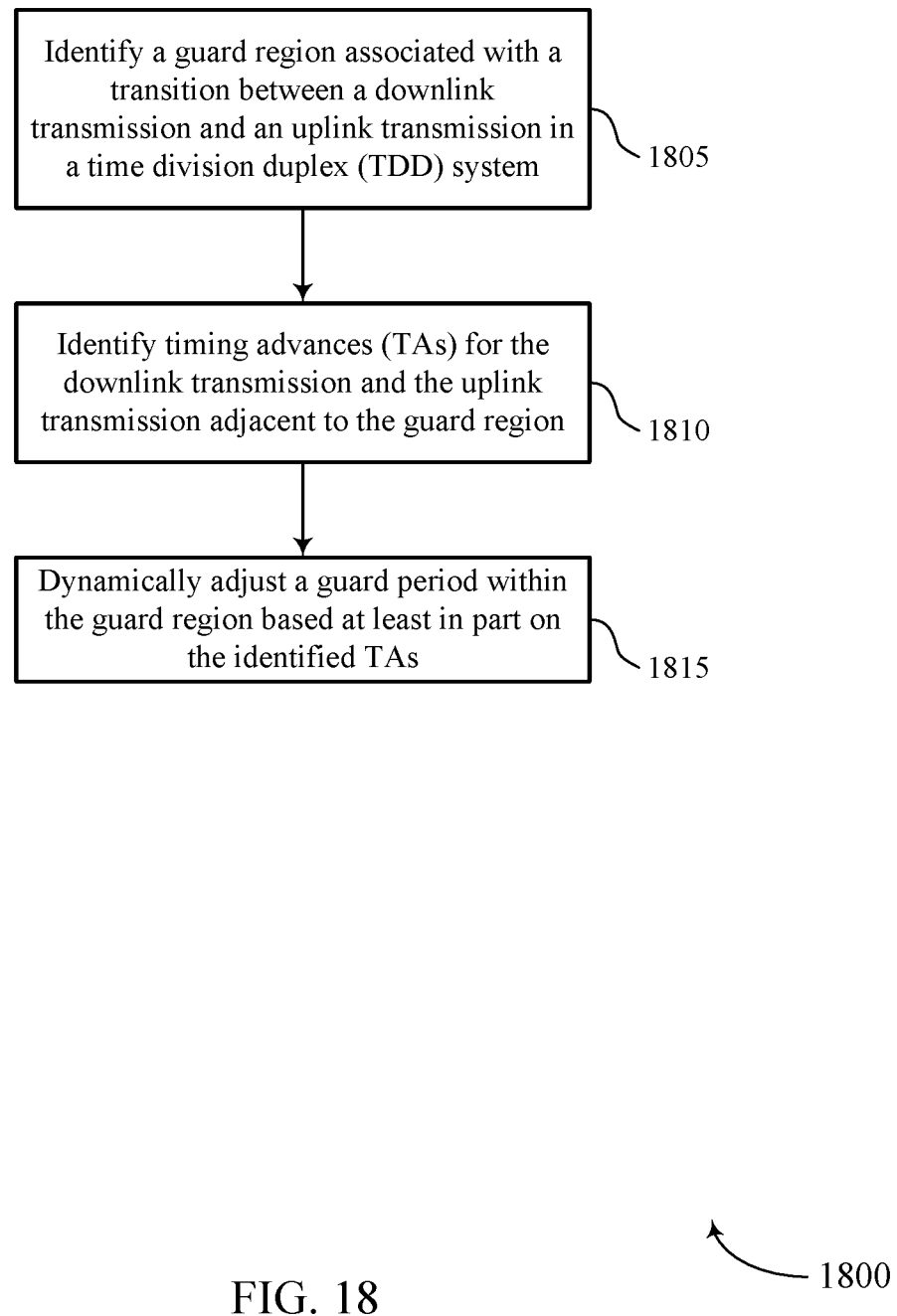
FIGS. 18 through 27 show flowcharts illustrating methods for guard period modification in a TDD wireless system in accordance with aspects of the present disclosure.

FIG. 18 shows a flowchart illustrating a method 1800 for guard period modification in a TDD wireless system in accordance with aspects of the present disclosure. The operations of method 1800 may be implemented by a base station 105 or its components as described herein. For example, the operations of method 1800 may be performed by a base station communications manager as described with reference to FIGS. 10 through 13. In some examples, a base station 105 may execute a set of codes to control the functional elements of the device to perform the functions described below. Additionally or alternatively, the base station 105 may perform aspects the functions described below using special-purpose hardware.

At block 1805 the base station 105 may identify a guard region associated with a transition between a downlink transmission and an uplink transmission in a time division duplex (TDD) system. The operations of block 1805 may be performed according to the methods described with reference to FIGS. 1 through 9. In certain examples, aspects of the operations of block 1805 may be performed by a guard region identification component as described with reference to FIGS. 10 through 13.

At block 1810 the base station 105 may identify timing advances (TAs) for the downlink transmission and the uplink transmission adjacent to the guard region. The operations of block 1810 may be performed according to the methods described with reference to FIGS. 1 through 9. In certain examples, aspects of the operations of block 1810 may be performed by a TA component as described with reference to FIGS. 10 through 13.

At block 1815 the base station 105 may dynamically adjust a guard period within the guard region based at least in part on the identified TAs. The operations of block 1815 may be performed according to the methods described with reference to FIGS. 1 through 9. In certain examples, aspects of the operations of block 1815 may be performed by a guard period component as described with reference to FIGS. 10 through 13.

Figure 19:
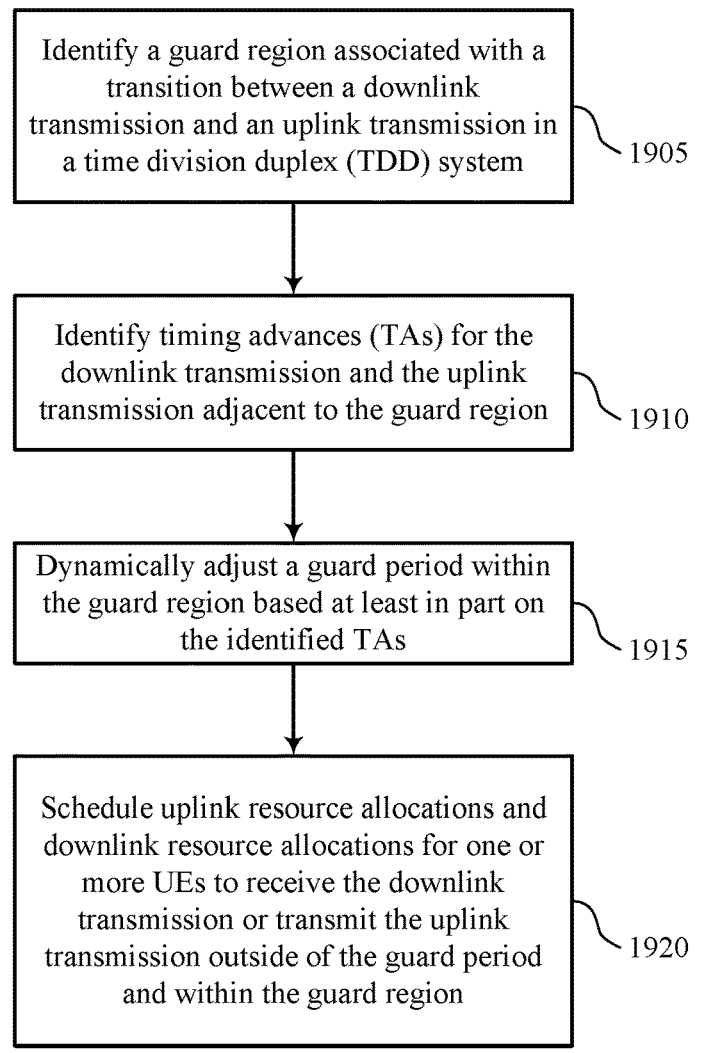

FIG. 19 shows a flowchart illustrating a method 1900 for guard period modification in a TDD wireless system in accordance with aspects of the present disclosure. The operations of method 1900 may be implemented by a base station 105 or its components as described herein. For example, the operations of method 1900 may be performed by a base station communications manager as described with reference to FIGS. 10 through 13. In some examples, a base station 105 may execute a set of codes to control the functional elements of the device to perform the functions described below. Additionally or alternatively, the base station 105 may perform aspects the functions described below using special-purpose hardware.

At block 1905 the base station 105 may identify a guard region associated with a transition between a downlink transmission and an uplink transmission in a time division duplex (TDD) system. The operations of block 1905 may be performed according to the methods described with reference to FIGS. 1 through 9. In certain examples, aspects of the operations of block 1905 may be performed by a guard region identification component as described with reference to FIGS. 10 through 13.

At block 1910 the base station 105 may identify timing advances (TAs) for the downlink transmission and the uplink transmission adjacent to the guard region. The operations of block 1910 may be performed according to the methods described with reference to FIGS. 1 through 9. In certain examples, aspects of the operations of block 1910 may be performed by a TA component as described with reference to FIGS. 10 through 13.

At block 1915 the base station 105 may dynamically adjust a guard period within the guard region based at least in part on the identified TAs. The operations of block 1915 may be performed according to the methods described with reference to FIGS. 1 through 9. In certain examples, aspects of the operations of block 1915 may be performed by a guard period component as described with reference to FIGS. 10 through 13.

At block 1920 the base station 105 may schedule uplink resource allocations and downlink resource allocations for one or more UEs to receive the downlink transmission or transmit the uplink transmission outside of the guard period and within the guard region. The operations of block 1920 may be performed according to the methods described with reference to FIGS. 1 through 9. In certain examples, aspects of the operations of block 1920 may be performed by a scheduling component as described with reference to FIGS. 10 through 13.

Figure 20:
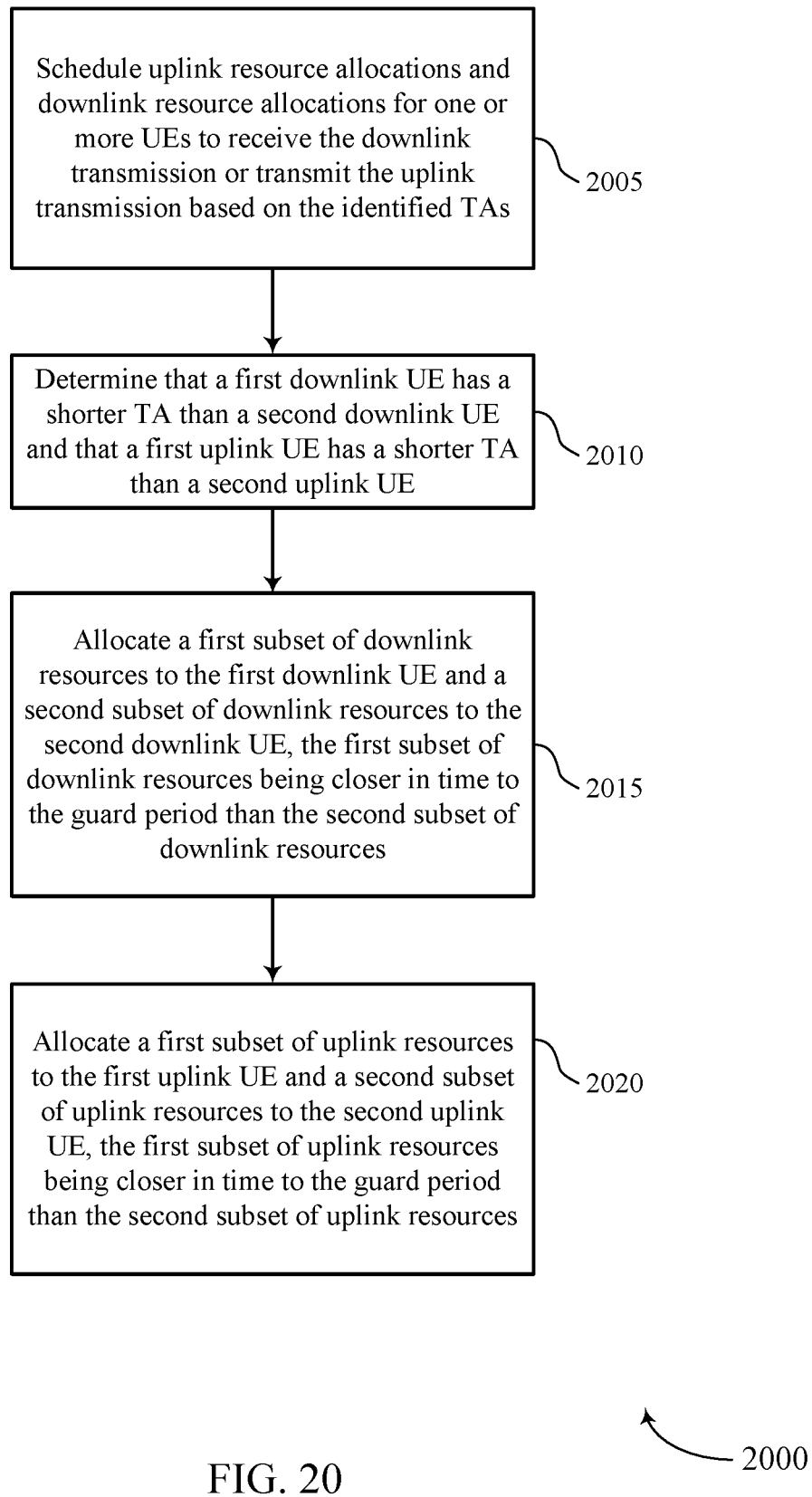

FIG. 20 shows a flowchart illustrating a method 2000 for guard period modification in a TDD wireless system in accordance with aspects of the present disclosure. The operations of method 2000 may be implemented by a base station 105 or its components as described herein. For example, the operations of method 2000 may be performed by a base station communications manager as described with reference to FIGS. 10 through 13. In some examples, a base station 105 may execute a set of codes to control the functional elements of the device to perform the functions described below. Additionally or alternatively, the base station 105 may perform aspects the functions described below using special-purpose hardware.

At block 2005 the base station 105 may schedule uplink resource allocations and downlink resource allocations for one or more UEs to receive the downlink transmission or transmit the uplink transmission based on identified TAs, as discussed with respect to FIGS. 18 and 19. The operations of block 2005 may be performed according to the methods described with reference to FIGS. 1 through 9. In certain examples, aspects of the operations of block 2005 may be performed by a scheduling component as described with reference to FIGS. 10 through 13.

At block 2010 the base station 105 may determine that a first downlink UE has a shorter TA than a second downlink UE and that a first uplink UE has a shorter TA than a second uplink UE. The operations of block 2010 may be performed according to the methods described with reference to FIGS. 1 through 9. In certain examples, aspects of the operations of block 2010 may be performed by a scheduling component as described with reference to FIGS. 10 through 13.

At block 2015 the base station 105 may allocate a first subset of downlink resources to the first downlink UE and a second subset of downlink resources to the second downlink UE, the first subset of downlink resources being closer in time to the guard period than the second subset of downlink resources. The operations of block 2015 may be performed according to the methods described with reference to FIGS. 1 through 9. In certain examples, aspects of the operations of block 2015 may be performed by a scheduling component as described with reference to FIGS. 10 through 13.

At block 2020 the base station 105 may allocate a first subset of uplink resources to the first uplink UE and a second subset of uplink resources to the second uplink UE, the first subset of uplink resources being closer in time to the guard period than the second subset of uplink resources. The operations of block 2020 may be performed according to the methods described with reference to FIGS. 1 through 9. In certain examples, aspects of the operations of block 2020 may be performed by a scheduling component as described with reference to FIGS. 10 through 13.

Figure 21:
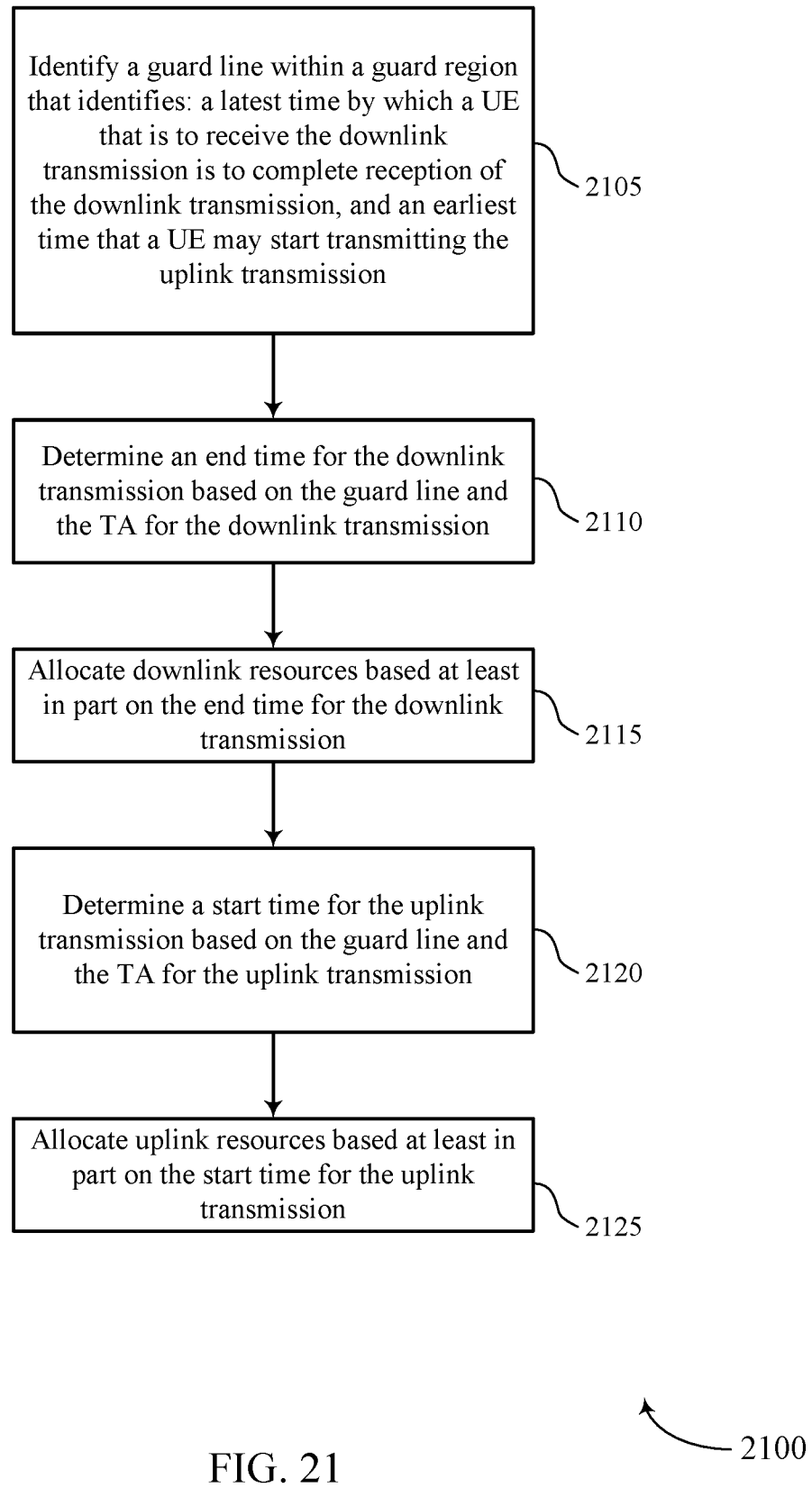

FIG. 21 shows a flowchart illustrating a method 2100 for guard period modification in a TDD wireless system in accordance with aspects of the present disclosure. The operations of method 2100 may be implemented by a base station 105 or its components as described herein. For example, the operations of method 2100 may be performed by a base station communications manager as described with reference to FIGS. 10 through 13. In some examples, a base station 105 may execute a set of codes to control the functional elements of the device to perform the functions described below. Additionally or alternatively, the base station 105 may perform aspects the functions described below using special-purpose hardware.

At block 2105 the base station 105 may identify a guard line within a guard region that identifies: a latest time by which a UE that is to receive the downlink transmission is to complete reception of the downlink transmission, and an earliest time that a UE may start transmitting the uplink transmission. The operations of block 2105 may be performed according to the methods described with reference to FIGS. 1 through 9. In certain examples, aspects of the operations of block 2105 may be performed by a guard line identification component as described with reference to FIGS. 10 through 13.

At block 2110 the base station 105 may determine an end time for the downlink transmission based on the guard line and the TA for the downlink transmission. The operations of block 2110 may be performed according to the methods described with reference to FIGS. 1 through 9. In certain examples, aspects of the operations of block 2110 may be performed by a guard period component as described with reference to FIGS. 10 through 13.

At block 2115 the base station 105 may allocate downlink resources based at least in part on the end time for the downlink transmission. The operations of block 2115 may be performed according to the methods described with reference to FIGS. 1 through 9. In certain examples, aspects of the operations of block 2115 may be performed by a scheduling component as described with reference to FIGS. 10 through 13.

At block 2120 the base station 105 determine a start time for the uplink transmission based on the guard line and the TA for the uplink transmission. The operations of block 2120 may be performed according to the methods described with reference to FIGS. 1 through 9. In certain examples, aspects of the operations of block 2120 may be performed by a guard period component as described with reference to FIGS. 10 through 13.

At block 2125 the base station 105 may allocate uplink resources based at least in part on the start time for the uplink transmission. The operations of block 2125 may be performed according to the methods described with reference to FIGS. 1 through 9. In certain examples, aspects of the operations of block 2125 may be performed by a scheduling component as described with reference to FIGS. 10 through 13.

Figure 22:
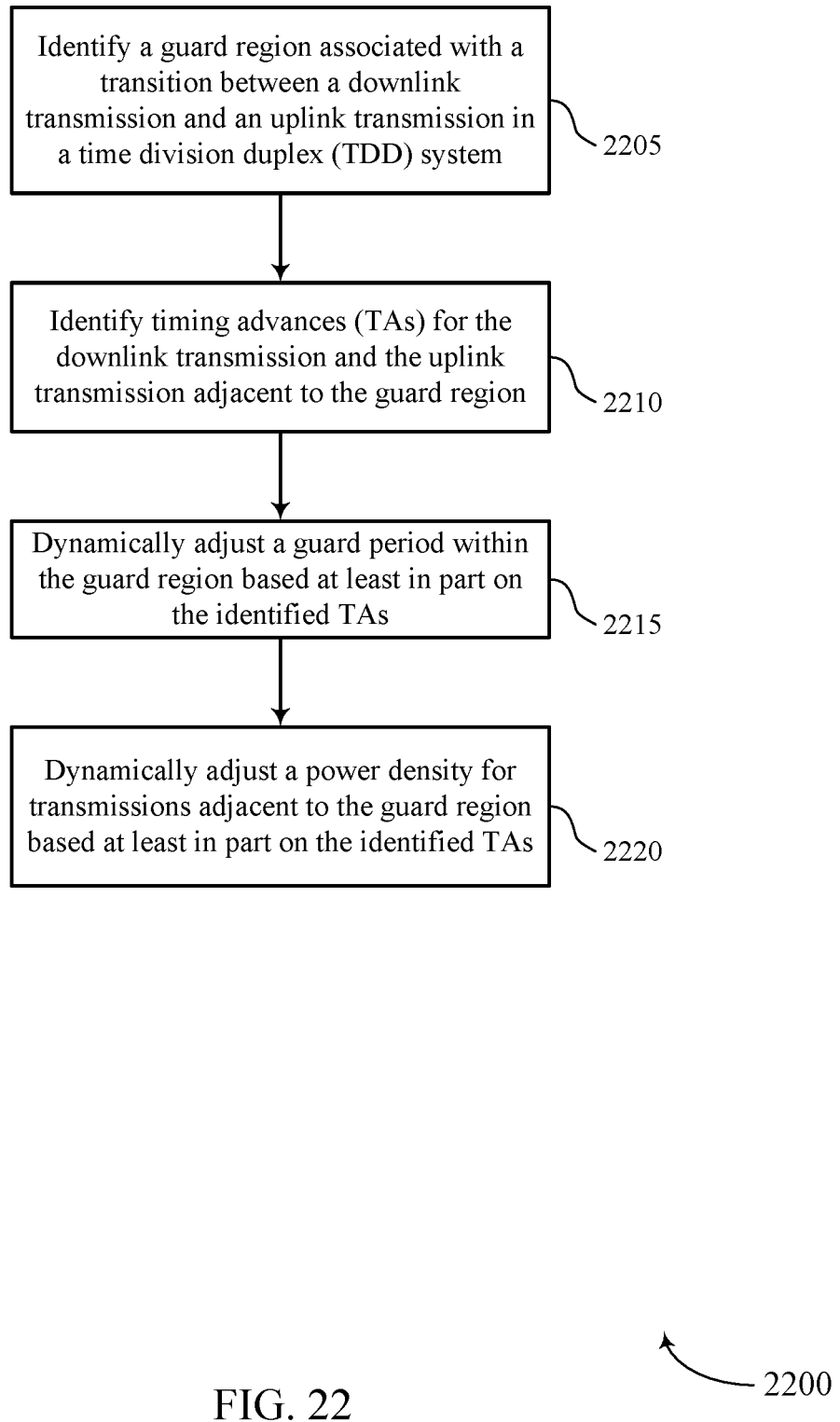

FIG. 22 shows a flowchart illustrating a method 2200 for guard period modification in a TDD wireless system in accordance with aspects of the present disclosure. The operations of method 2200 may be implemented by a base station 105 or its components as described herein. For example, the operations of method 2200 may be performed by a base station communications manager as described with reference to FIGS. 10 through 13. In some examples, a base station 105 may execute a set of codes to control the functional elements of the device to perform the functions described below. Additionally or alternatively, the base station 105 may perform aspects the functions described below using special-purpose hardware.

At block 2205 the base station 105 may identify a guard region associated with a transition between a downlink transmission and an uplink transmission in a time division duplex (TDD) system. The operations of block 2205 may be performed according to the methods described with reference to FIGS. 1 through 9. In certain examples, aspects of the operations of block 2205 may be performed by a guard region identification component as described with reference to FIGS. 10 through 13.

At block 2210 the base station 105 may identify timing advances (TAs) for the downlink transmission and the uplink transmission adjacent to the guard region. The operations of block 2210 may be performed according to the methods described with reference to FIGS. 1 through 9. In certain examples, aspects of the operations of block 2210 may be performed by a TA component as described with reference to FIGS. 10 through 13.

At block 2215 the base station 105 may dynamically adjust a guard period within the guard region based at least in part on the identified TAs. The operations of block 2215 may be performed according to the methods described with reference to FIGS. 1 through 9. In certain examples, aspects of the operations of block 2215 may be performed by a guard period component as described with reference to FIGS. 10 through 13.

At block 2220 the base station 105 may dynamically adjust a power density for transmissions adjacent to the guard region based at least in part on the identified TAs. The operations of block 2220 may be performed according to the methods described with reference to FIGS. 1 through 9. In certain examples, aspects of the operations of block 2220 may be performed by a power density component as described with reference to FIGS. 10 through 13.

Figure 23:
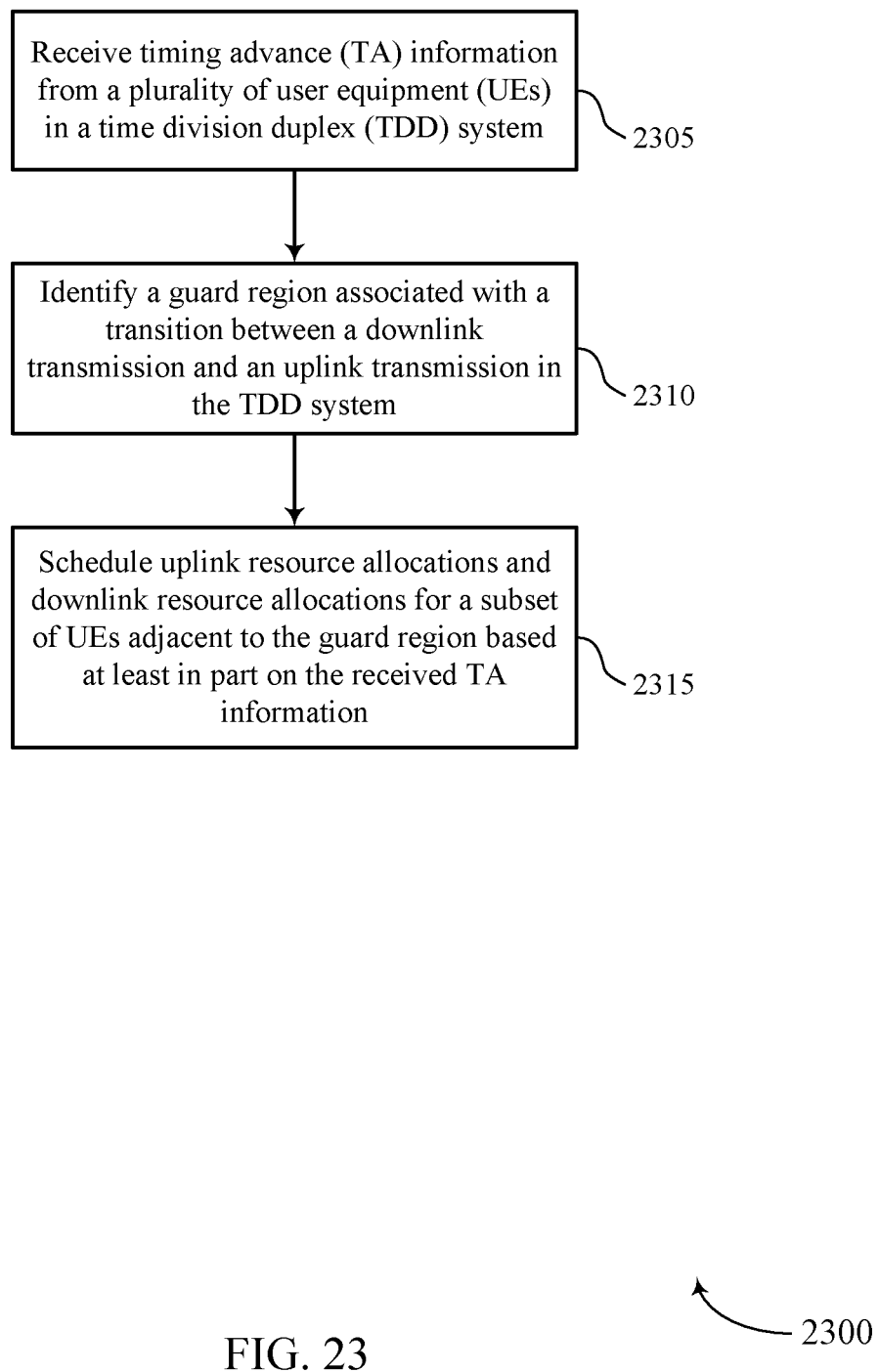

FIG. 23 shows a flowchart illustrating a method 2300 for guard period modification in a TDD wireless system in accordance with aspects of the present disclosure. The operations of method 2300 may be implemented by a base station 105 or its components as described herein. For example, the operations of method 2300 may be performed by a base station communications manager as described with reference to FIGS. 10 through 13. In some examples, a base station 105 may execute a set of codes to control the functional elements of the device to perform the functions described below. Additionally or alternatively, the base station 105 may perform aspects the functions described below using special-purpose hardware.

At block 2305 the base station 105 may receive TA information from a plurality of user equipment (UEs) in a time division duplex (TDD) system. The operations of block 2305 may be performed according to the methods described with reference to FIGS. 1 through 9. In certain examples, aspects of the operations of block 2305 may be performed by a TA component as described with reference to FIGS. 10 through 13, which may operate in cooperation with a receiver 1010 or 1110 as described with reference to FIG. 10 or 11, or antenna(s) 1340 and transceiver(s) 1335 as described with reference to FIG. 13.

At block 2310 the base station 105 may identify a guard region associated with a transition between a downlink transmission and an uplink transmission in the TDD system. The operations of block 2310 may be performed according to the methods described with reference to FIGS. 1 through 9. In certain examples, aspects of the operations of block 2310 may be performed by a guard region identification component as described with reference to FIGS. 10 through 13.

At block 2315 the base station 105 may schedule uplink resource allocations and downlink resource allocations for a subset of UEs adjacent to the guard region based at least in part on the received TA information. The operations of block 2315 may be performed according to the methods described with reference to FIGS. 1 through 9. In certain examples, aspects of the operations of block 2315 may be performed by a scheduling component as described with reference to FIGS. 10 through 13.

Figure 24:
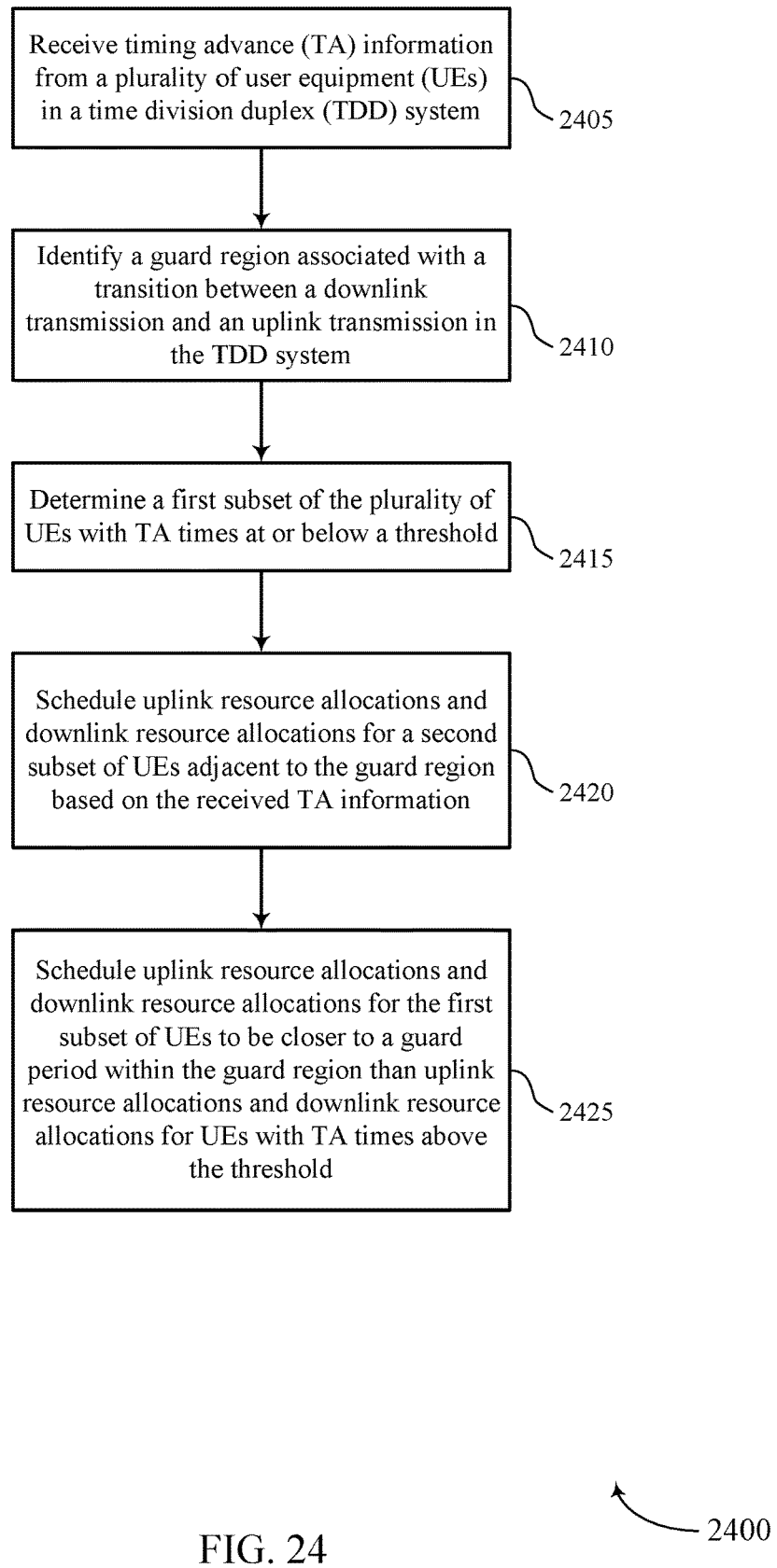

FIG. 24 shows a flowchart illustrating a method 2400 for guard period modification in a TDD wireless system in accordance with aspects of the present disclosure. The operations of method 2400 may be implemented by a base station 105 or its components as described herein. For example, the operations of method 2400 may be performed by a base station communications manager as described with reference to FIGS. 10 through 13. In some examples, a base station 105 may execute a set of codes to control the functional elements of the device to perform the functions described below. Additionally or alternatively, the base station 105 may perform aspects the functions described below using special-purpose hardware.

At block 2405 the base station 105 may receive TA information from a set of user equipment (UEs) in a time division duplex (TDD) system. The operations of block 2405 may be performed according to the methods described with reference to FIGS. 1 through 9. In certain examples, aspects of the operations of block 2405 may be performed by a TA component as described with reference to FIGS. 10 through 13, which may operate in cooperation with a receiver 1010 or 1110 as described with reference to FIG. 10 or 11, or antenna(s) 1340 and transceiver(s) 1335 as described with reference to FIG. 13.

At block 2410 the base station 105 may identify a guard region associated with a transition between a downlink transmission and an uplink transmission in the TDD system.

The operations of block 2410 may be performed according to the methods described with reference to FIGS. 1 through 9. In certain examples, aspects of the operations of block 2410 may be performed by a guard region identification component as described with reference to FIGS. 10 through 13.

At block 2415 the base station 105 may determine a first subset of the set UEs with TA times at or below a threshold. The operations of block 2415 may be performed according to the methods described with reference to FIGS. 1 through 9. In certain examples, aspects of the operations of block 2415 may be performed by a TA component as described with reference to FIGS. 10 through 13.

At block 2420 the base station 105 may schedule uplink resource allocations and downlink resource allocations for a second subset of UEs adjacent to the guard region based on the received TA information. The operations of block 2420 may be performed according to the methods described with reference to FIGS. 1 through 9. In certain examples, aspects of the operations of block 2420 may be performed by a scheduling component as described with reference to FIGS. 10 through 13.

At block 2425 the base station 105 may schedule uplink resource allocations and downlink resource allocations for the first subset of UEs to be closer to a guard period within the guard region than uplink resource allocations and downlink resource allocations for UEs with TA times above the threshold. The operations of block 2425 may be performed according to the methods described with reference to FIGS. 1 through 9. In certain examples, aspects of the operations of block 2425 may be performed by a scheduling component as described with reference to FIGS. 10 through 13.

Figure 25:
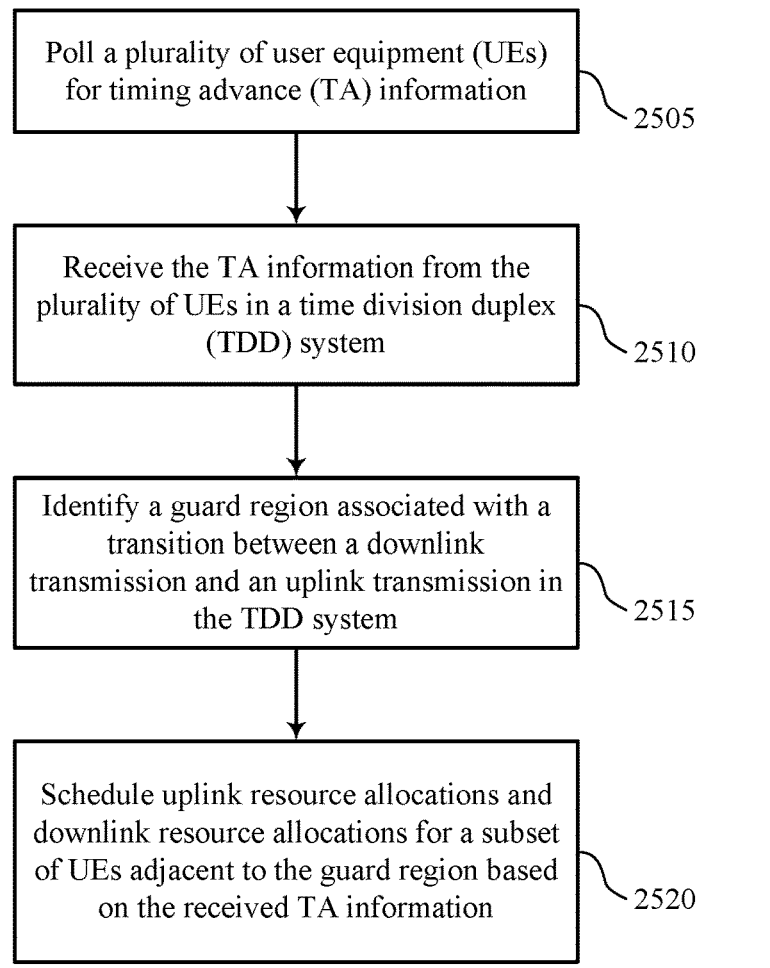

FIG. 25 shows a flowchart illustrating a method 2500 for guard period modification in a TDD wireless system in accordance with aspects of the present disclosure. The operations of method 2500 may be implemented by a base station 105 or its components as described herein. For example, the operations of method 2500 may be performed by a base station communications manager as described with reference to FIGS. 10 through 13. In some examples, a base station 105 may execute a set of codes to control the functional elements of the device to perform the functions described below. Additionally or alternatively, the base station 105 may perform aspects the functions described below using special-purpose hardware.

At block 2505 the base station 105 may poll a plurality of UEs for TA information. The operations of block 2505 may be performed according to the methods described with reference to FIGS. 1 through 9. In certain examples, aspects of the operations of block 2505 may be performed by a polling component as described with reference to FIGS. 10 through 13.

At block 2510 the base station 105 may receive the TA information from the plurality of user equipment (UEs) in a time division duplex (TDD) system. The operations of block 2510 may be performed according to the methods described with reference to FIGS. 1 through 9. In certain examples, aspects of the operations of block 2510 may be performed by a TA component as described with reference to FIGS. 10 through 13, which may operate in cooperation with a receiver 1010 or 1110 as described with reference to FIG. 10 or 11, or antenna(s) 1340 and transceiver(s) 1335 as described with reference to FIG. 13.

At block 2515 the base station 105 may identify a guard region associated with a transition between a downlink transmission and an uplink transmission in the TDD system. The operations of block 2515 may be performed according to the methods described with reference to FIGS. 1 through 9. In certain examples, aspects of the operations of block 2515 may be performed by a guard region identification component as described with reference to FIGS. 10 through 13.

At block 2520 the base station 105 may schedule uplink resource allocations and downlink resource allocations for a subset of UEs adjacent to the guard region based on the received TA information. The operations of block 2520 may be performed according to the methods described with reference to FIGS. 1 through 9. In certain examples, aspects of the operations of block 2520 may be performed by a scheduling component as described with reference to FIGS. 10 through 13.

Figure 26:
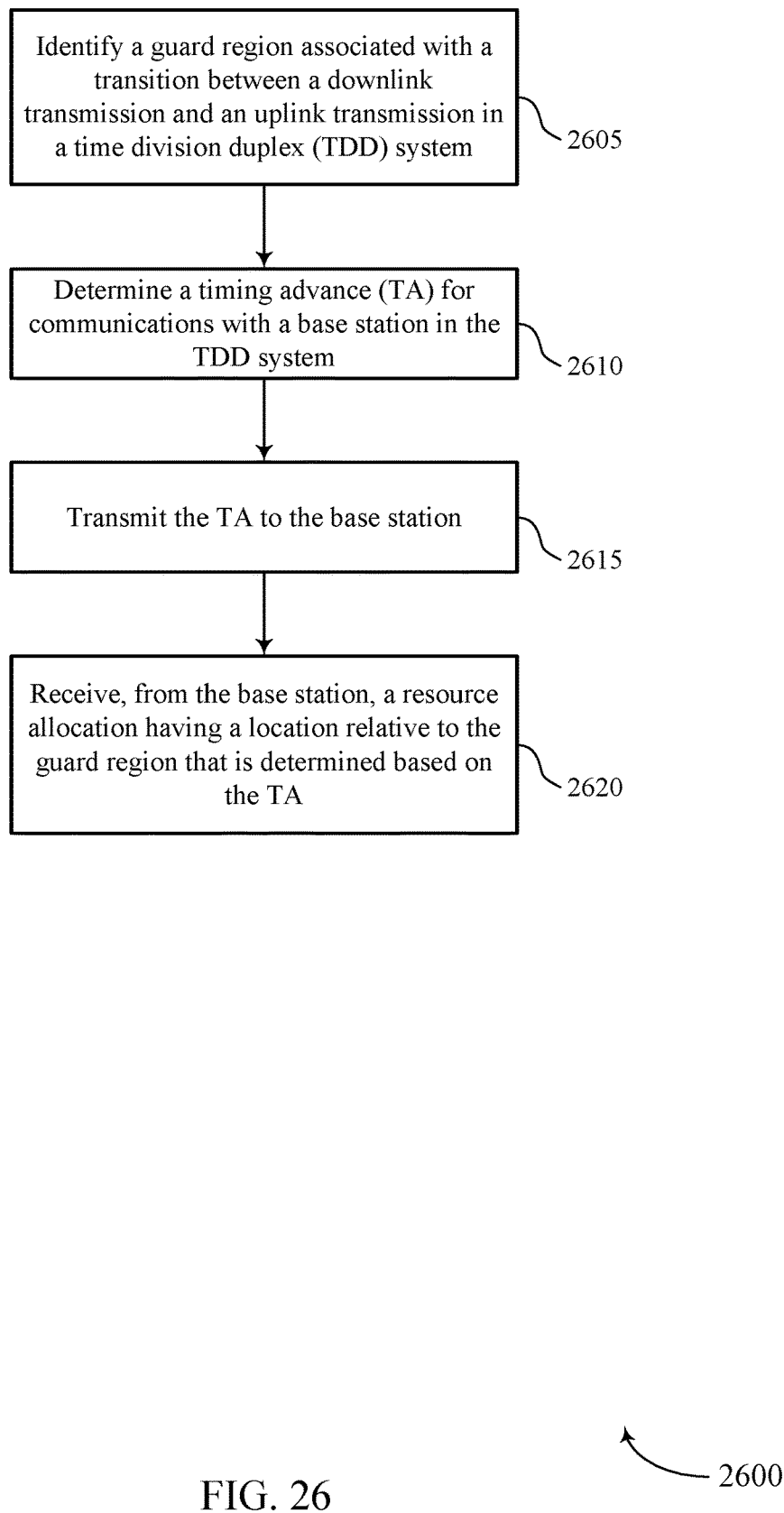

FIG. 26 shows a flowchart illustrating a method 2600 for guard period modification in a TDD wireless system in accordance with aspects of the present disclosure. The operations of method 2600 may be implemented by a UE 115 or its components as described herein. For example, the operations of method 2600 may be performed by a UE communications manager as described with reference to FIGS. 14 through 17. In some examples, a UE 115 may execute a set of codes to control the functional elements of the device to perform the functions described below. Additionally or alternatively, the UE 115 may perform aspects the functions described below using special-purpose hardware.

At block 2605 the UE 115 may identify a guard region associated with a transition between a downlink transmission and an uplink transmission in a time division duplex (TDD) system. The operations of block 2605 may be performed according to the methods described with reference to FIGS. 1 through 9. In certain examples, aspects of the operations of block 2605 may be performed by a guard region identification component as described with reference to FIGS. 14 through 17.

At block 2610 the UE 115 may determine a TA for communications with a base station in the TDD system. The operations of block 2610 may be performed according to the methods described with reference to FIGS. 1 through 9. In certain examples, aspects of the operations of block 2610 may be performed by a TA component as described with reference to FIGS. 14 through 17.

At block 2615 the UE 115 may transmit the TA to the base station. The operations of block 2615 may be performed according to the methods described with reference to FIGS. 1 through 9. In certain examples, aspects of the operations of block 2615 may be performed by a TA transmission component as described with reference to FIGS. 14 through 17, which may operate in cooperation with a transmitter 1420 or 1520 as described with reference to FIG. 14 or 15, or antenna(s) 1740 and transceiver(s) 1735 as described with reference to FIG. 17.

At block 2620 the UE 115 may receive, from the base station, a resource allocation having a location relative to the guard region that is determined based on the TA. The operations of block 2620 may be performed according to the methods described with reference to FIGS. 1 through 9. In certain examples, aspects of the operations of block 2620 may be performed by a scheduling component as described with reference to FIGS. 14 through 17, which may operate in cooperation with a receiver 1410 or 1510 as described with reference to FIG. 14 or 15, or antenna(s) 1740 and transceiver(s) 1735 as described with reference to FIG. 17.

Figure 27:
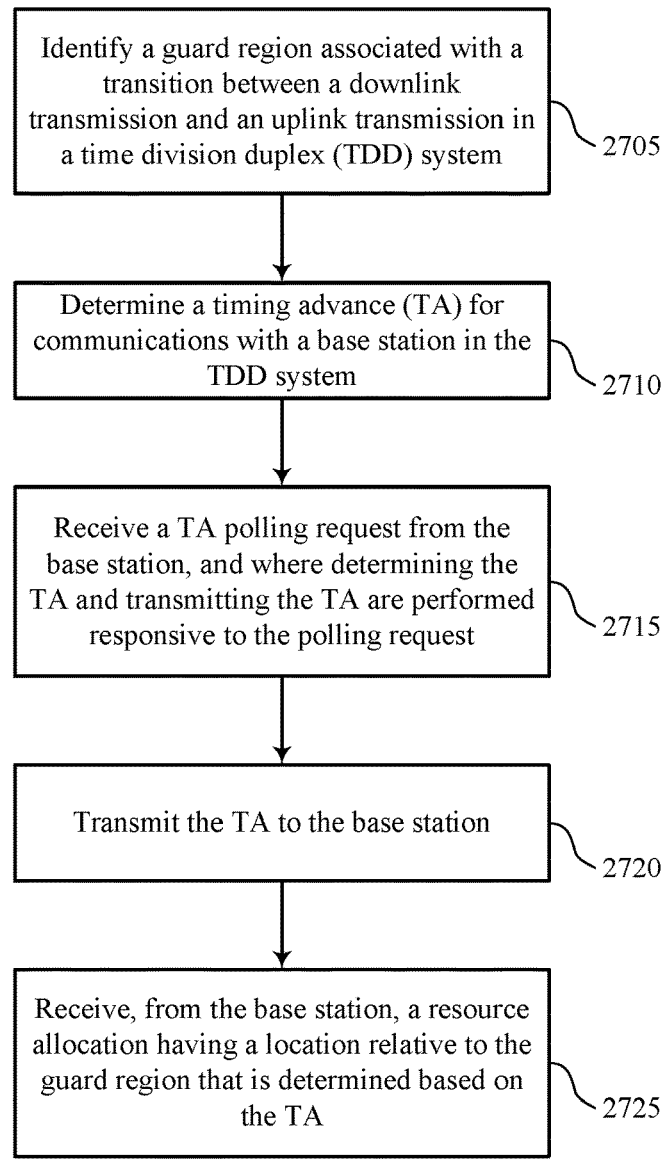

FIG. 27 shows a flowchart illustrating a method 2700 for guard period modification in a TDD wireless system in accordance with aspects of the present disclosure. The operations of method 2700 may be implemented by a UE 115 or its components as described herein. For example, the operations of method 2700 may be performed by a UE communications manager as described with reference to FIGS. 14 through 17. In some examples, a UE 115 may execute a set of codes to control the functional elements of the device to perform the functions described below. Additionally or alternatively, the UE 115 may perform aspects the functions described below using special-purpose hardware.

At block 2705 the UE 115 may identify a guard region associated with a transition between a downlink transmission and an uplink transmission in a time division duplex (TDD) system. The operations of block 2705 may be performed according to the methods described with reference to FIGS. 1 through 9. In certain examples, aspects of the operations of block 2705 may be performed by a guard region identification component as described with reference to FIGS. 14 through 17.

At block 2710 the UE 115 may determine a TA for communications with a base station in the TDD system. The operations of block 2710 may be performed according to the methods described with reference to FIGS. 1 through 9. In certain examples, aspects of the operations of block 2710 may be performed by a TA component as described with reference to FIGS. 14 through 17.

At block 2715 the UE 115 may receive a TA polling request from the base station, and where determining the TA and transmitting the TA are performed responsive to the polling request. The operations of block 2715 may be performed according to the methods described with reference to FIGS. 1 through 9. In certain examples, aspects of the operations of block 2715 may be performed by a polling component as described with reference to FIGS. 14 through 17, which may operate in cooperation with a receiver 1410 or 1510 as described with reference to FIG. 14 or 15, or antenna(s) 1740 and transceiver(s) 1735 as described with reference to FIG. 17.

At block 2720 the UE 115 may transmit the TA to the base station. The operations of block 2720 may be performed according to the methods described with reference to FIGS. 1 through 9. In certain examples, aspects of the operations of block 2720 may be performed by a TA transmission component as described with reference to FIGS. 14 through 17, which may operate in cooperation with a transmitter 1420 or 1520 as described with reference to FIG. 14 or 15, or antenna(s) 1740 and transceiver(s) 1735 as described with reference to FIG. 17.

At block 2725 the UE 115 may receive, from the base station, a resource allocation having a location relative to the guard region that is determined based on the TA. The operations of block 2725 may be performed according to the methods described with reference to FIGS. 1 through 9. In certain examples, aspects of the operations of block 2725 may be performed by a scheduling component as described with reference to FIGS. 14 through 17, which may operate in cooperation with a receiver 1410 or 1510 as described with reference to FIG. 14 or 15, or antenna(s) 1740 and transceiver(s) 1735 as described with reference to FIG. 17.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM).

An orthogonal frequency division multiple access (OFDMA) system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are new releases of Universal Mobile Telecommunications System (UMTS) that use E-UTRA. UTRA, E-UTRA, UMTS, LTE, LTE-A, and Global System for Mobile communications (GSM) are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE system may be described for purposes of example, and LTE terminology may be used in much of the description, the techniques described herein are applicable beyond LTE applications.

In LTE/LTE-A networks, including such networks described herein, the term evolved node B (eNB) may be generally used to describe the base stations. The wireless communications system or systems described herein may include a heterogeneous LTE/LTE-A network in which different types of evolved node B (eNBs) provide coverage for various geographical regions. For example, each eNB or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a base station, comprising:
   identifying a guard region associated with a transition between a downlink transmission and an uplink transmission in a time division duplex (TDD) system;
   identifying timing advances (TAs) for the downlink transmission and the uplink transmission adjacent to the guard region;
   identifying two or more downlink user equipments (UEs);
   determining that a first downlink UE has a shorter TA than a second downlink UE;
   dynamically adjusting a guard period within the guard region based at least in part on the identified TAs;
   allocating a first subset of downlink resources to the first downlink UE and a second subset of downlink resources to the second downlink UE, the first subset of downlink resources being closer in time to the guard period than the second subset of downlink resources; and
   dynamically adjusting a power density for at least downlink transmissions adjacent to the guard period based at least in part on the identified TAs.

2. The method of claim 1, further comprising:
   scheduling uplink resource allocations and downlink resource allocations for one or more UEs to receive the downlink transmission or to transmit the uplink transmission outside of the guard period and within the guard region or outside of the guard region.

3. The method of claim 2, wherein the guard region corresponds to a legacy guard period of the TDD system.

4. The method of claim 1, further comprising:
   scheduling uplink resource allocations and downlink resource allocations for one or more UEs to receive the downlink transmission or transmit the uplink transmission based at least in part on the identified TAs.

5. The method of claim 1, further comprising:
   identifying two or more uplink UEs;
   determining that a first uplink UE has a shorter TA than a second uplink UE; and
   allocating a first subset of uplink resources to the first uplink UE and a second subset of uplink resources to the second uplink UE, the first subset of uplink resources being closer in time to the guard period than the second subset of uplink resources.

6. The method of claim 1, wherein identifying the TAs comprises:
   polling a plurality of UEs for associated TAs and receiving TA information in response to the polling; or
   receiving periodic transmissions from a plurality of UEs without polling, the periodic transmissions including TA information for the UEs.

7. The method of claim 1, further comprising:
   identifying a guard line within the guard region that identifies:
      a latest time by which a UE that is to receive the downlink transmission is to complete reception of the downlink transmission, and
      an earliest time that a UE may start transmitting the uplink transmission.

8. The method of claim 7, wherein dynamically adjusting the guard period comprises:
   determining an end time for the downlink transmission based on the guard line and the TA for the downlink transmission; and
   allocating downlink resources based at least in part on the end time for the downlink transmission.

9. The method of claim 8, wherein dynamically adjusting the guard period further comprises:
   determining a start time for the uplink transmission based on the guard line and the TA for the uplink transmission; and
   allocating uplink resources based at least in part on the start time for the uplink transmission.

10. The method of claim 7, wherein the guard line is identified for a plurality of neighboring base stations of the TDD system.

11. The method of claim 1, wherein the power density is adjusted for a duration of a transmission time interval (TTI) of the downlink transmission or the uplink transmission.

12. The method of claim 11, wherein the power density for the downlink transmissions adjacent to the guard period is mapped based on a location position in time of wireless resources used for the downlink transmissions relative to the guard period.

13. The method of claim 11, wherein:
   the power density for the downlink transmissions adjacent to the guard period is signaled to two or more downlink UEs prior to a transmission of the downlink transmissions adjacent to the guard period, and
   the signaling indicates at least one of power density steps in time, or changes to a traffic-to-pilot ratio (TPR) in time, or both.

14. An apparatus for wireless communication, comprising:
   means for identifying a guard region associated with a transition between a downlink transmission and an uplink transmission in a time division duplex (TDD) system;
   means for identifying timing advances (TAs) for the downlink transmission and the uplink transmission adjacent to the guard region;
   means for identifying two or more downlink user equipments (UEs);
   means for determining that a first downlink UE has a shorter TA than a second downlink UE;
   means for dynamically adjusting a guard period within the guard region based at least in part on the identified TAs;
   means allocating a first subset of downlink resources to the first downlink UE and a second subset of downlink resources to the second downlink UE, the first subset of downlink resources being closer in time to the guard period than the second subset of downlink resources; and
   means for dynamically adjusting a power density for at least downlink transmissions adjacent to the guard period based at least in part on the identified TAs.

15. An apparatus for wireless communication, in a system comprising:
   a processor;
   memory in electronic communication with the processor; and
   instructions stored in the memory and operable, when executed by the processor, to cause the apparatus to:
      identify a guard region associated with a transition between a downlink transmission and an uplink transmission in a time division duplex (TDD) system;
      identify timing advances (TAs) for the downlink transmission and the uplink transmission adjacent to the guard region;
      identify two or more downlink user equipments (UEs);
      determine that a first downlink UE has a shorter TA than a second downlink UE;

dynamically adjust a guard period within the guard region based at least in part on the identified TAs;

allocate a first subset of downlink resources to the first downlink UE and a second subset of downlink resources to the second downlink UE, the first subset of downlink resources being closer in time to the guard period than the second subset of downlink resources; and dynamically adjust a power density for at least downlink transmissions adjacent to the guard period based at least in part on the identified TAs.

16. The apparatus of claim 15, wherein the instructions are operable to cause the apparatus to:
schedule uplink resource allocations and downlink resource allocations for one or more UEs to receive the downlink transmission or to transmit the uplink transmission outside of the guard period and within the guard region or outside of the guard region.

17. The apparatus of claim 16, wherein the guard region corresponds to a legacy guard period of the TDD system.

18. The apparatus of claim 15, wherein the instructions are operable to cause the apparatus to:
schedule uplink resource allocations and downlink resource allocations for one or more UEs to receive the downlink transmission or transmit the uplink transmission based at least in part on the identified TAs.

19. The apparatus of claim 15, wherein the instructions are operable to cause the apparatus to:
identify two or more uplink UEs;
determine that a first uplink UE has a shorter TA than a second uplink UE; and
allocate a first subset of uplink resources to the first uplink UE and a second subset of uplink resources to the second uplink UE, the first subset of uplink resources being closer in time to the guard period than the second subset of uplink resources.

20. The apparatus of claim 15, wherein identifying the TAs comprises:
polling a plurality of UEs for associated TAs and receiving TA information in response to the polling; or
receiving periodic transmissions from a plurality of UEs without polling, the periodic transmissions including TA information for the UEs.

21. The apparatus of claim 15, wherein the instructions are operable to cause the apparatus to:
identify a guard line within the guard region that identifies: a latest time by which a UE that is to receive the downlink transmission is to complete reception of the downlink transmission, and
an earliest time that a UE may start transmitting the uplink transmission.

22. The apparatus of claim 21, wherein dynamically adjusting the guard period comprises:
determining an end time for the downlink transmission based on the guard line and the TA for the downlink transmission; and allocating downlink resources based at least in part on the end time for the downlink transmission.

23. The apparatus of claim 22, wherein dynamically adjusting the guard period further comprises:
determining a start time for the uplink transmission based on the guard line and the TA for the uplink transmission; and
allocating uplink resources based at least in part on the start time for the uplink transmission.

24. The apparatus of claim 21, wherein the guard line is identified for a plurality of neighboring base stations of the TDD system.

25. The apparatus of claim 15,
wherein the power density is adjusted for a duration of a transmission time interval (TTI) of the downlink transmission or the uplink transmission.

26. The apparatus of claim 25, wherein the power density for the downlink transmissions adjacent to the guard period is mapped based on a location position in time of wireless resources used for the downlink transmissions relative to the guard period.

27. The apparatus of claim 25, wherein:
the power density for the downlink transmissions adjacent to the guard period is signaled to two or more downlink UEs prior to a transmission of the downlink transmissions adjacent to the guard period, and
the signaling indicates at least one of power density steps in time, changes to a traffic-to-pilot ratio (TPR) in time, or both.

28. A non-transitory computer readable medium storing code for wireless communication, the code comprising instructions executable by a processor to:
identify a guard region associated with a transition between a downlink transmission and an uplink transmission in a time division duplex (TDD) system;
identify timing advances (TAs) for the downlink transmission and the uplink transmission adjacent to the guard region;
identify two or more downlink user equipments (UEs);
determine that a first downlink UE has a shorter TA than a second downlink UE;
dynamically adjust a guard period within the guard region based at least in part on the identified TAs;
allocate a first subset of downlink resources to the first downlink UE and a second subset of downlink resources to the second downlink UE, the first subset of downlink resources being closer in time to the guard period than the second subset of downlink resources; and
dynamically adjust a power density for at least downlink transmissions adjacent to the guard period based at least in part on the identified TAs.

* * * * *